United States Patent
Truong et al.

(10) Patent No.: US 10,783,412 B1
(45) Date of Patent: Sep. 22, 2020

(54) SMART PAGE ENCODING SYSTEM INCLUDING LINEARIZATION FOR VIEWING AND PRINTING

(71) Applicant: KYOCERA DOCUMENT SOLUTIONS INC., Osaka (JP)

(72) Inventors: Duc Phu Truong, Westminster, CA (US); Neil-Paul Payoyo Bermundo, Glendora, CA (US); Mohamed El Sayed Mostafa, Hawthorne, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/588,487

(22) Filed: Sep. 30, 2019

(51) Int. Cl.
*G06K 15/00* (2006.01)
*G06K 15/02* (2006.01)

(52) U.S. Cl.
CPC ........ *G06K 15/181* (2013.01); *G06K 15/1825* (2013.01)

(58) Field of Classification Search
None
See application file for complete search history.

(56) References Cited

U.S. PATENT DOCUMENTS

| | | | | |
|---|---|---|---|---|
| 7,948,651 B2* | 5/2011 | Truong | ................ | G06K 15/02 358/1.15 |
| 9,015,814 B1* | 4/2015 | Zakorzhevsky | ...... | G06F 21/564 726/4 |
| 2005/0273772 A1* | 12/2005 | Matsakis | ................ | G06F 8/41 717/136 |
| 2006/0170944 A1* | 8/2006 | Arps | .................... | G06F 3/1248 358/1.13 |
| 2006/0236225 A1* | 10/2006 | Achilles | ............... | G06F 40/221 715/205 |
| 2006/0253465 A1* | 11/2006 | Willis | ..................... | G06F 40/14 |
| 2007/0024885 A1* | 2/2007 | Kim | ...................... | G06F 3/1248 358/1.13 |
| 2007/0290895 A1* | 12/2007 | Mitchell | ........... | G06K 15/1814 341/50 |
| 2010/0053665 A1* | 3/2010 | Price | .................... | G06F 3/1265 358/1.15 |
| 2019/0102125 A1* | 4/2019 | Suzuki | ................. | G06F 3/1254 |

* cited by examiner

*Primary Examiner* — Henok Shiferaw
(74) *Attorney, Agent, or Firm* — McDonnell Boehnen Hulbert & Berghoff LLP

(57) ABSTRACT

Methods and apparatus for encoding data streams are provided. A computing device can receive an input data stream encoded in an encoder-input format. The input data stream can include a header identifying the encoder-input format, pages of content, a cross-reference table referencing objects in the pages of content, and a trailer object. The computing device can determine a list of pages within the input data stream. The computing device can reformat the input data stream into an output data stream having an encoder-output format. The output data stream can include an identifier identifying the encoder-output format, a lookup table, pages in the list of pages, the cross-reference table, and the trailer object. The lookup table can reference objects and specify locations of pages within the output data stream. The computing device can generate an output based on the output data stream.

20 Claims, 13 Drawing Sheets

1200

1210 Receive, at a computing device, an encoder-input data stream encoded in a first format, the encoder-input data stream being initiated by a header identifying the first format, the encoder-input data stream including one or more pages of content and being terminated by a cross-reference table and a trailer object, the cross-reference table referencing objects in the one or more pages of content

1220 Determine a list of pages of the one or more pages within the encoder-input data stream using the computing device

1230 Reformat the encoder-input data stream into an encoder-output data stream encoded in a second format using the computing device, the encoder-output data stream including pages listed in the list of pages, the encoder-output data stream being initiated by an identifier identifying the second format and a lookup table and terminated by the cross-reference table and the trailer object, where the lookup table references objects within the encoder-output data stream and specifies locations of the pages listed in the list of pages within the encoder-output data stream

1240 Generate an output of the computing device that is based on the encoder-output data stream

1310 Receive, at a computing device, a decoder-input data stream encoded in a first format, the decoder-input data stream including one or more pages of content, the decoder-input data stream being initiated by an identifier identifying the first format and a lookup table, where the lookup table references objects within the decoder-input data stream and specifies locations of each of the one or more pages within the decoder-input data stream 1320 Generate an output of the computing device based on the decoder-input data stream

FIG. 13

SMART PAGE ENCODING SYSTEM INCLUDING LINEARIZATION FOR VIEWING AND PRINTING

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server.

The networks can include many printing devices. Some or all of the printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Printing devices can print data, such as image data, that is encoded in one or more formats. Examples of these formats include Kyocera Page Description Language (KPDL), Printer Command Language (PCL), Portable Document Format (PDF), a generic Page Description Language (PDL), and PostScript. Other formats are possible as well. Some computing devices process data encoded in one or more of these formats.

SUMMARY

In a first aspect, a method is provided. A computing device receives an encoder-input data stream encoded in an encoder-input format. The encoder-input data stream is initiated by a header identifying the encoder-input format. The encoder-input data stream includes one or more pages of content and is terminated by a cross-reference table and a trailer object. The cross-reference table references objects in the one or more pages of content. The computing device determines a list of pages of the one or more pages within the encoder-input data stream. The computing device reformats the encoder-input data stream into an encoder-output data stream encoded in an encoder-output format. The encoder-output data stream includes pages listed in the list of pages. The encoder-output data stream is initiated by an identifier identifying the encoder-output format and a lookup table and terminated by the cross-reference table and the trailer object, where the lookup table references objects within the encoder-output data stream and specifies locations of the pages listed in the list of pages within the encoder-output data stream. The computing device generates an output of the computing device that is based on the encoder-output data stream.

In a second aspect, a printing device is provided. The printing device includes one or more processors and data storage. The data storage is configured to store at least computer-readable instructions that, when executed by the one or more processors, cause the printing device to perform tasks. The tasks include: receiving an encoder-input data stream encoded in an encoder-input format, the encoder-input data stream being initiated by a header identifying the encoder-input format, the encoder-input data stream including one or more pages of content and being terminated by a cross-reference table and a trailer object, the cross-reference table referencing objects in the one or more pages of content; determining a list of pages of the one or more pages within the encoder-input data stream; reformatting the encoder-input data stream into an encoder-output data stream encoded in an encoder-output format, the encoder-output data stream including pages listed in the list of pages, the encoder-output data stream being initiated by an identifier identifying the encoder-output format and a lookup table and terminated by the cross-reference table and the trailer object, where the lookup table references objects within the encoder-output data stream and specifies locations of the pages listed in the list of pages within the encoder-output data stream; and generating an output that is based on the encoder-output data stream.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 12 shows a flowchart for a method of encoding a data stream, according to example embodiments.

FIG. 13 shows a flowchart for a method of decoding a data stream, according to example embodiments.

DETAILED DESCRIPTION

Figure 1:
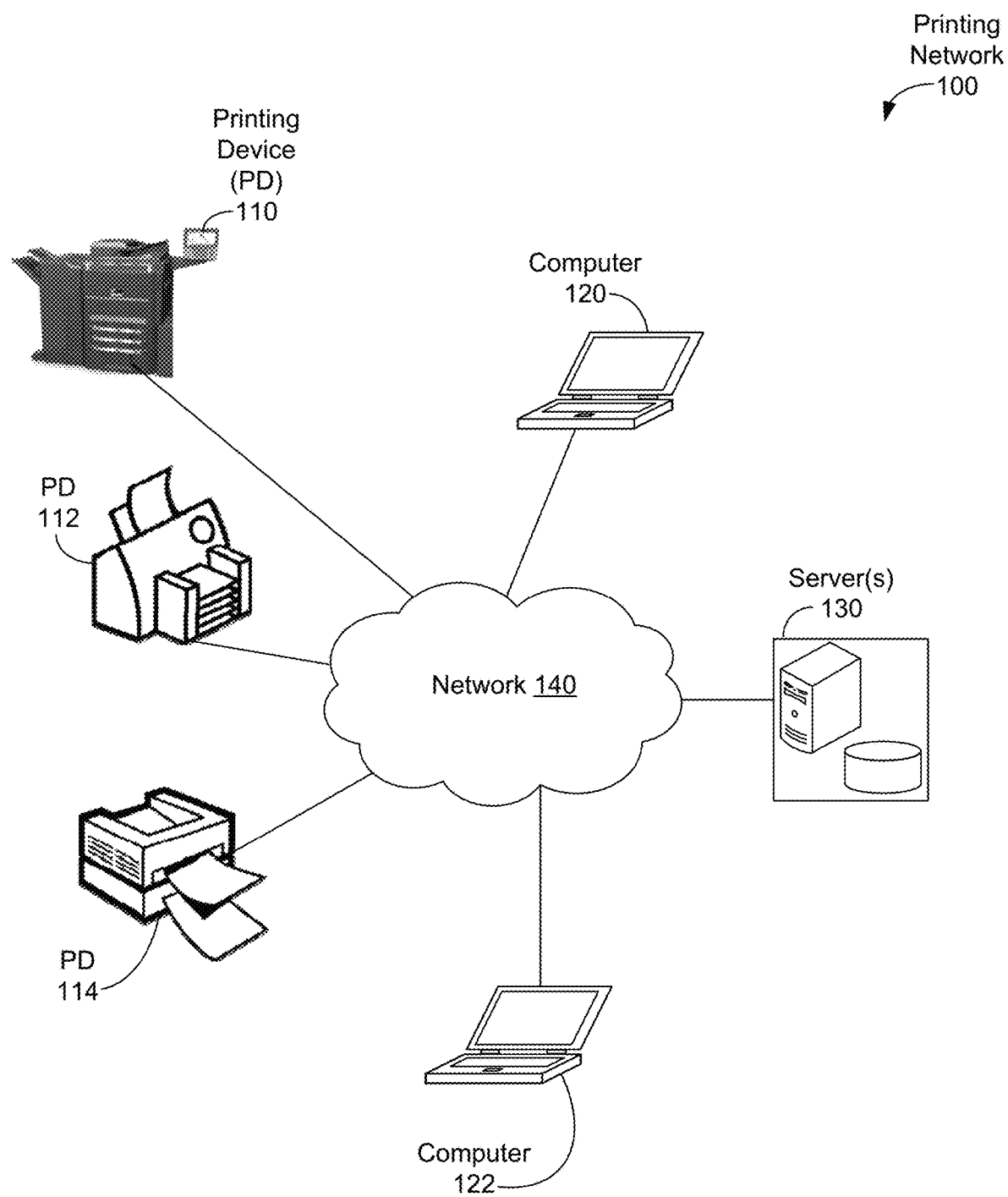
FIG. 1 is a diagram of a printing network, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

INTRODUCTION

When viewing a PDF file (e.g., using a web browser), the entire PDF file can be downloaded from a server. When the PDF file includes a large number of pages, complex pages, and/or has a large file size, downloading the entire PDF file can cause a user to wait a long time before being able to view any portion of the PDF file.

As used herein, a file can be permanent or non-permanent storage (e.g., a memory buffer) usable for storing data. Data stored in a file can be encoded in a file format, such as a PDF file format. If the data in the file is encoded in a file format FF1, the file can be termed a FF1 file; e.g., a PDF file stored data encoded in PDF format. In some examples, part or all the data of the file can be provided as a data stream or file stream. A data stream can be a sequence of information stored as one or more discrete quantities of information (e.g., bits, bytes, packets), where the one or more discrete quantities of information may or may not all store the same amount of information. A file stream can be a data stream whose sequence of information is from or otherwise represents a file storing the sequence of information. Data stored in a file encoded in one file format can be "decoded" or converted to another file format. In some examples, part or all of one or more files, data streams, and/or file streams can be provided using one or more memory objects; e.g., one or more memory buffers that store the part or all of the one or more files, data streams, and/or file streams. In these examples, if a memory object stores part or all of one or more files, data streams, and/or file streams formatted using a file format, then the memory object can be considered to be formatted using the file format; e.g., a memory buffer storing a file formatted using a PDF file format can be considered to be formatted to be a memory buffer formatted using the PDF file format.

A workflow for printing a PDF file can include sending the PDF file through a printer driver if printing using a software application. Then, the printer driver can generate a print job that is transmitted to a printing device over a network or to a printer port. At the printing device, the print job can be processed using a raster image processing (RIP) component and/or a graphics rendering component of the printing device before printing the PDF file on paper. For a large PDF file, the size of the print job generated in the printer driver will consequently be large as well. In cases where an entire print job is transmitted to the printing device, the transmission can be slow due to the size of the print job, which can adversely affect user experience and business workflow.

At the printing device, the RIP component can parse the print job, going through various resources such as external object dictionaries (i.e., xobjects), font dictionaries, color dictionaries, patterns, forms, and drawing commands to render pages of the print job. The PDF format enables reuse of resources on multiple pages, which can cause later pages in a sequence of pages of the print job to depend on preceding pages. These dependencies between pages can inhibit parallel processing of pages in PDF files.

Other example situations that can slow processing of PDF files and related print jobs include, PDF files having many pages, PDF files that are relatively larger, and print jobs where a portion of the PDF file is to be printed. Some PDF files do not store compressed data, such as compressed text. A PDF file that could possibly be compressed efficiently may not be compressed; e.g., because decompression may not be supported by a printing device printing the PDF file. Thus, some PDF files are not compressed, resulting in larger file sizes than necessary for corresponding print jobs. Further, transmitting large PDF files/print jobs can utilize a relatively large amount of bandwidth and time compared to corresponding compressed PDF files/print jobs. When one or more subsets of pages of a PDF file are to be printed, a PDF parser often parses an entire PDF file to extract the subset(s) of pages. Such parsing of entire files can waste time in processing unselected pages.

Some PDF files are linearized. A linearized PDF file enables faster access to a first page or any arbitrary page in comparison to a non-linearized PDF file. However, linearized PDF files can have some limitations:

- A linearized PDF file may not organize resources within the file to allow parallel processing of pages within the file. Rather, linearized PDF files (and non-linearized PDF files) permit pages to depend on other pages, thereby limiting parallel processing; e.g., causing pages to load incrementally instead of loading all at once.
- Access to an arbitrary page in a linearized PDF file can depend on the application that allows access to the PDF file. For example, for a web browser to access an arbitrary page of the linearized PDF file, a web server or network file server could (assuming server knowledge of the requested page): send the arbitrary page, send the pages from page 1 to the arbitrary page, or could send the entire linearized PDF file. For a Web browser to only access a series of arbitrary pages of a linearized PDF file, which may not be contiguous, the web server or network file server may have to extract and only transmit the series of arbitrary pages instead of the entire linearized PDF file.
- Linearized PDF is a file format specification that can rely on the use of a conforming PDF application to be able to take advantage of specific features of linearized PDF.
- Some applications, printer drivers, and print engines cannot process PDF pages in parallel due to inter-page dependencies and/or absence of access to page resources.
- While linearized PDF can speed access to arbitrary pages in linearized PDF file, linearization is not universally used for all PDF files; i.e., there are a wide variety of PDF documents that may not be linearized.
- The body of a non-linearized PDF file or a linearized PDF file can include one or more content streams of drawing commands, objects data and dictionaries. All of these data in the PDF body contains the pages in sequential order, where page 1 appears first, followed by subsequent pages. The bottom of the non-linearized PDF file or linearized PDF file can include a cross-reference table that contains offsets in the file for locating those drawing objects, data or dictionaries. The offsets are byte-positions or addresses in the non-linearized PDF file or linearized PDF file. The offsets are used to locate the content streams, drawing commands, objects data and dictionaries in the file. So, to locate data within the non-linearized PDF file or linearized PDF file, the cross-reference table stored at the end of the file has to be obtained.

Herein is provided a new file format termed "Smart PDF" and related techniques to address these shortcomings of PDF, including linearized PDF. A Smart PDF file, which is a file whose contents are encoded using the Smart PDF file format, can perform simultaneous and/or parallel execution of decompression and rendering of pages. Rendering of a Smart PDF file can be performed without waiting for the whole PDF file to be transferred to the printing device.

The Smart PDF file format enables ready access to "objects" or basic entities within a Smart PDF file by organizing the objects so that pages of a document stored using the Smart PDF file can be rendered in parallel. To that end, the Smart PDF file format uses a lookup table that stores information about finding and extracting objects necessary to access, render, and/or print each page. The lookup table can enable immediate access to and fast (constant time) searching for objects in a Smart PDF file. Objects within each page of a Smart PDF file can be compressed individually and can be packaged with the page. Further, objects of a Smart PDF file can be arranged in a page order used by a rendering process. For example, a Smart PDF file having two pages can store (compressed) objects of page 1 ahead of (compressed) objects required for rendering page 2. If a subset of pages of a Smart PDF file are to be processed (e.g., a range of pages is to be printed, a portion of a file is to be displayed), only objects used in the subset of pages are decompressed. Compressed resources for pages not selected for processing are not decompressed, thereby improving processing speed for Smart PDF files.

A printer driver and/or one or more other software applications can use a "plug-in" or software extension to support encoding and/or decoding data (e.g., files, print jobs) in the Smart PDF file format. A network file server, web server, and/or one or more other computing devices can provide one or more services that can receive requests to encode and/or decode data that uses the Smart PDF file format and provide the corresponding encoded and/or decoded data as one or more outputs. Similarly, one or more printing devices can have hardware and/or software to encode and/or decode data that uses the Smart PDF file format; e.g., to enable printing of documents that use the Smart PDF file format.

For example, an encoder function can receive input data, including, but not limited to, one or more non-linearized PDF file(s), linearized PDF file(s)), and file(s) representing print job(s). The encoder function can analyze, extract, reformat and/or encode the input data into output data utilizing the Smart PDF file format (e.g., Smart PDF files). For example, the encoder function can rearrange pages and/or objects of input file(s) as part of encoding the input file(s) into Smart PDF file(s). The encoder function can compress objects in the output data individually and can include a starting address of each compressed object in a lookup table. Further, the encoder function can compress drawing commands for each page into one compressed object and can include a starting address of the object storing compressed drawing commands in the lookup table.

The output data utilizing the Smart PDF file format can utilize less memory/file storage and/or can be otherwise optimized compared to the input data, particularly when processing a subset or other group of arbitrary pages of the input data. In some examples, the encoder function can prepare the input data for processing in Smart PDF file format by a RIP component of a printing device.

A decoder function of a plug-in, service, and/or printing device can receive input data encoded using the Smart PDF file format, including, but not limited to, one or more Smart PDF files and file(s) representing print job(s) of Smart PDF files. The decoder function can analyze, extract, reformat and/or encode the input data into output data utilizing a non-Smart PDF file format; e.g., output non-linearized PDF files. In particular, the decoder function can simultaneously decompress compressed objects and drawing commands of the Smart-PDF-formatted input data, which can speed up overall decoding and/or rendering time of the input data. In some examples, the decoder function can process a portion of a Smart PDF file; e.g., the decoder function can use user input and/or other inputs to select one or more pages of a Smart PDF file for conversion to a non-Smart PDF file format. By decoding only a portion of a Smart PDF file, the decoder function can reduce an amount of time and other resources used to decode the Smart PDF file and for later processing (e.g., display, printing) of the decoded portion of the Smart PDF file.

A Smart PDF encoder can embody the above-mentioned encoder function and a Smart PDF decoder can embody the above-mentioned decoder function. The Smart PDF encoder and/or the Smart PDF decoder can be at least a portion of software, firmware, and/or hardware of a computing device, including but not limited to, a computing device that is a component of a printing device. Software embodiments of the Smart PDF encoder and/or the Smart PDF decoder can include, but are not limited to, plug-ins, software applications, driver software (e.g., a printer driver), system software, and/or service/server software. Firmware and/or hardware embodiments of the Smart PDF encoder and/or the Smart PDF decoder can include, but are not limited to, firmware and/or hardware specifically configured for use as a Smart PDF encoder and/or a Smart PDF decoder.

In some examples, a Smart PDF encoder service can utilize a Smart PDF encoder to provide access to Smart PDF encoding. For example, the Smart PDF encoder service can be a system service that is provided using one or more servers, such one or more network file servers and/or web servers. In operation, a request to encode a PDF file can be received at the Smart PDF encoder service. If the received PDF file is not in Smart PDF file format, the Smart PDF encoder service can use the herein-described techniques to encode the received PDF file into Smart PDF file format and generate a Smart PDF file that corresponds to the received PDF file. If the received PDF file is already in Smart PDF file format, the received PDF file can be verified as being in Smart PDF file format and then be designated as a Smart PDF file. Then, the Smart PDF encoder service can provide the Smart PDF file as a response to the previously-mentioned request.

In some examples, a Smart PDF decoder service can utilize a Smart PDF decoder to provide access to Smart PDF decoding. For example, the Smart PDF decoder service can be a system service that is provided using one or more servers, such as one or more network file servers and/or web servers. In operation, a request to decode a Smart PDF file can be received at the Smart PDF decoder service. If the received file is in Smart PDF file format, the Smart PDF decoder service can use the herein-described techniques to decode the received file into linearized PDF format to generate a PDF file that corresponds to the received Smart PDF file. If the received file is already in linearized PDF format or non-linearized PDF format, the received PDF file can be verified as being in linearized PDF format or non-linearized PDF format and then be designated as a PDF file. Then, the Smart PDF decoder service can provide the PDF file as a response to the previously-mentioned request. In some examples, the encoder service and the decoder service can be combined to be an encoder/decoder service; i.e., the combined encoder/decoder service can convert files between linearized or non-linearized PDF format and Smart PDF file format.

As an example use of the encoder/decoder service, a software application, such as a PDF viewer application, can receive one or more files as input, such as one or more non-linearized PDF files, linearized PDF files, and/or Smart PDF files. The PDF viewer application can use the encoder/decoder service to convert non-linearized PDF files and linearized PDF files to Smart PDF files, where the encoder/decoder service can pass through input Smart PDF files without change (perhaps after verification). Then, the PDF viewer application can display the Smart PDF files as directed by a user of the PDF viewer application. In other examples, the PDF viewer application can use a plug-in to perform the functionality of the encoder/decoder service.

As another example use of the encoder/decoder service, Smart PDF firmware and/or hardware of a printing device (or computing device) can be used to implement a decoder function and/or an encoder function for the Smart PDF file format. Then, when the printing device receives one or more files as input, such as one or more non-linearized PDF files, linearized PDF files, and/or Smart PDF files to be printed, the Smart PDF firmware and/or hardware can convert non-linearized PDF files and linearized PDF files to Smart PDF files and pass through input Smart PDF files without change (perhaps after verification). Then, the printing device can print the resulting Smart PDF files. In other examples, software of the printing device can perform some or all of the functionality of the encoder/decoder service. Other embodiments and examples of using an encoder/decoder service, an encoder function for the Smart PDF file format, and/or a decoder function for the Smart PDF file format are possible as well.

In some examples, the encoder function for the Smart PDF file format and/or the decoder function for the Smart PDF file format can include logic for making decisions about how non-linearized and/or linearized PDF files will be encoded. These decisions can be based on file sizes of the non-linearized and/or linearized PDF files, numbers of pages of the non-linearized and/or linearized PDF files, and/or measurement of complexity of pages of the non-linearized and/or linearized PDF files. This logic for making decisions can allow for flexibility for processing; e.g., in environments having a large number and/or a wide variety of non-linearized and/or linearized PDF files.

The Smart PDF file format can be used explicitly or implicitly. For example, a software application can be used to create and/or modify data. Then, the software application can be directed to save the data to a Smart PDF file. As the software application was explicitly directed to use the Smart PDF file format, the software application can be considered to have explicitly used the Smart PDF file format to save data. As another example, a printer driver (or other software application) can be used to generate a print job that includes one or more linearized or non-linearized PDF files. Then, a plug-in of the printer driver can receive the print job as input, use the encoder function to convert the linearized or non-linearized PDF file(s) of the print job to Smart PDF file format, and the resulting Smart PDF formatted files can be printed by a printing device assigned to the print job. As there was no explicit request to use the Smart PDF file format, the printer driver can be considered to have implicitly used the Smart PDF file format to process this print job. Other explicit and implicit uses of the Smart PDF file format are possible as well.

The herein-described techniques and apparatus can improve overall printing performance of PDF print jobs due to the relatively-small size of Smart PDF files, as Smart PDF files have compressed pages and objects. Such relatively-small Smart PDF files can be smaller than linearized or non-linearized PDF files to transmit, reducing storage and network bandwidth of Smart PDF files (e.g., when transmitted and saved during network printing or remote file storage, when locally saved on a computing device). The use of lookup tables by the Smart PDF file format supports direct access to resources and drawing commands, which can result in faster access to these resources, further speeding rendering, printing, and display of Smart PDF files. Printing devices can utilize software or firmware, such as RIP firmware, to quickly access specific pages of a Smart PDF file.

Further, rendering of Smart PDF files (e.g., during display or printing to paper) can be performed in parallel on a per-page basis, enabling a parallel speed-up of rendering. And, rendering of a subset of pages of a Smart PDF file can be faster than rendering of the same subset of pages of a linearized or non-linearized PDF file as the lookup table of the Smart PDF file is not stored at the end of the file, unlike the cross-reference table of the linearized or non-linearized PDF file; thus, the end of the Smart PDF file does not have to be fetched before rendering the subset of pages in contrast to the linearized or non-linearized PDF file. In some scenarios, decompression time of Smart PDF files can be relatively small compared to network downloading time of an uncompressed linearized or non-linearized PDF file, especially when a file server is heavily loaded due to many file requests.

Printing System Examples

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests, are possible as well.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100.

In some embodiments, server(s) 130 can provide additional services as well (or instead), such as services related to some or all of the functionality for one or more document solutions and managed print services; e.g., encoder services, decoder services, encoder/decoder services, functionality for accounting and maintenance of solutions and services, functionality for document workflows, such as processing forms, hard-copy signatures, client authentication/access functions, user interface functionality, local and/or remote network based storage management involving devices in printing network 100.

For example, server(s) 130 can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.), document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114). The data can include data used in processing jobs (e.g., spooled data for print jobs, files for file-related requests, etc.), access-management related data, primary identification characteristics and/or model-dependent information about printing devices served by server(s) 130 and perhaps other data.

As another example, server(s) 130 can provide functionality related to a network file server for communicating and/or storing files and/or other data using network 140; e.g., sending print jobs to be printed to one or more of printing devices 110, 112, 114, storing files provided by computers 120, 122, saving databases used by some or all of the devices connected to network 140, providing encoder/decoder services for Smart PDF files. In some examples, one or more servers of server(s) 130 can provide functionality of both a print server and a network file server. In some examples, one or more servers of server(s) 130 can provide other server functionality; e.g., web server functionality for storing, communicating, and/or otherwise providing content as requested via the World Wide Web.

Figure 2:
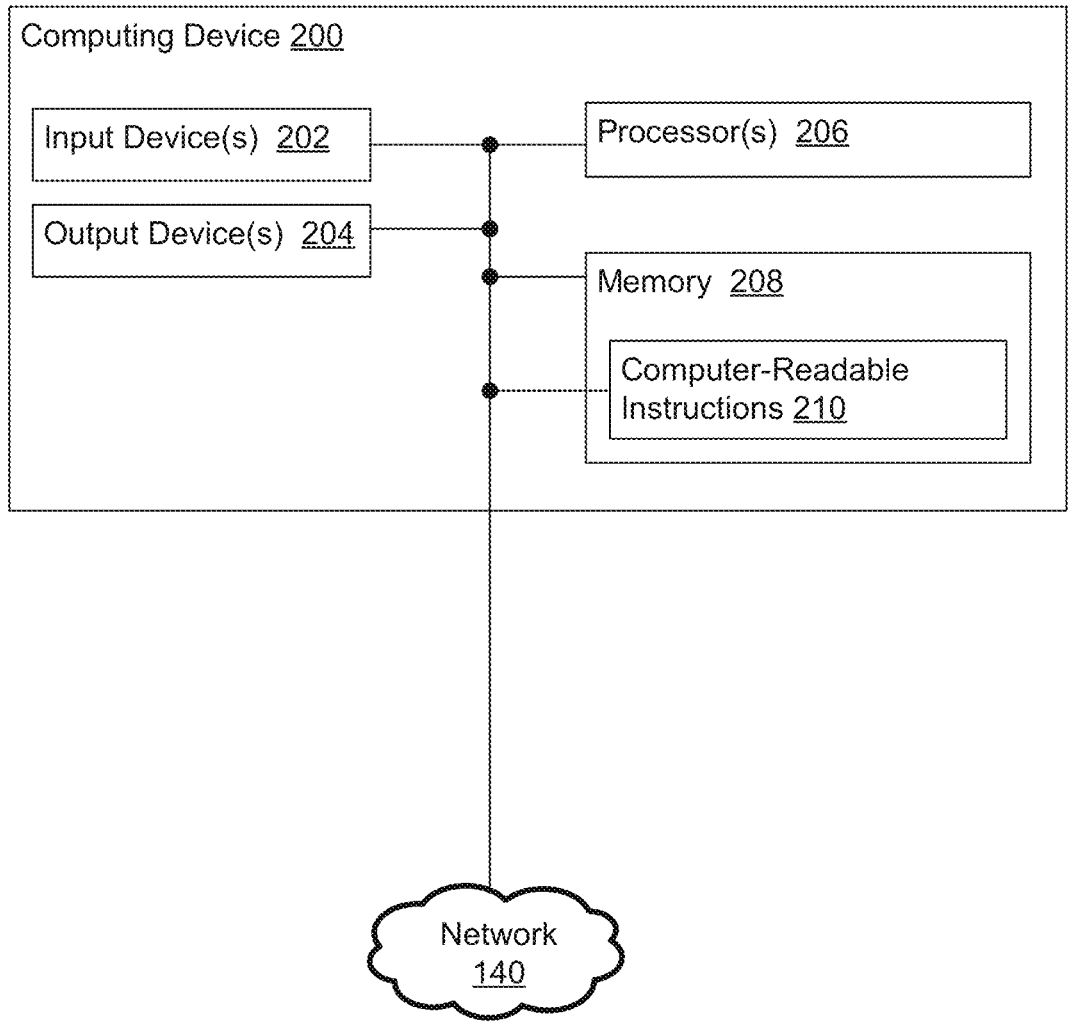
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, and memory 208.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Sensors can include devices configured to measure conditions in an environment of computing device 200 and provide data about that environment, such data including, but not limited to, location data, velocity (speed, direction) data, acceleration data, and other data about the environment for computing device 200. Example sensors include, but are not limited to, Global Positioning System (GPS) sensor(s), location sensors(s), gyroscope(s), accelerometer(s), magnetometer(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices.

In particular, memory 208 can store computer-readable instructions 210 that, when executed by processor(s) 206, can cause a computing device to perform functions, such as but not limited to, some or all of at least the herein-described functionality of software, firmware, devices, networks, methods, diagrams, files, images, equations, and/or scenarios. Computing device 200 can be configured at least to perform at least part of the herein-described techniques related to the Smart PDF file format and/or functionality related to: a Smart PDF file, a non-linearized PDF file, a linearized PDF file, an encoder function, an encoder service, a decoder function, a decoder service, an encoder/decoder service, a print server, a network file server, a computing device, a computer, a printing device, a printer, printing devices 110, 112, 114, computers 120, 122, server(s) 130, F1 formatted file 300, F2 formatted file 400, F3 formatted file 500, and/or methods 700, 800, 900, 1000, 1100, 1200, and/or 1300. For example, computing device 200 can be configured to perform at least part of the herein-described techniques related to the Smart PDF file format and/or the functionality listed immediately above by executing some or all of computer-readable instructions 210 using processor(s) 206.

Techniques for Using the Smart PDF File Format

Figure 3:
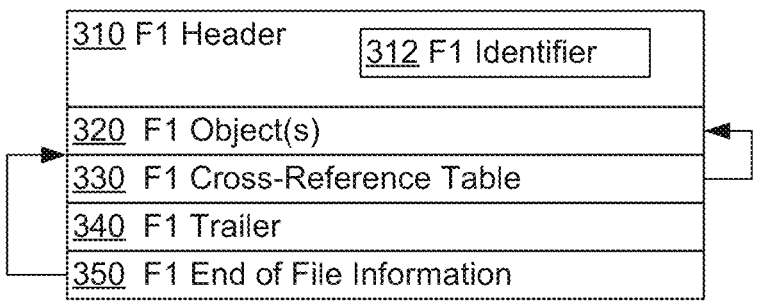
FIG. 3 is a block diagram illustrating a file encoded using a first format, according to example embodiments.

FIG. 3 is a block diagram illustrating F1 formatted file 300 encoded using a F1 file format, according to example embodiments. Another term for the F1 file format used herein is the non-linearized PDF file format. FIG. 3 shows that F1 formatted file 300 includes F1 header 310, one or more F1 objects 320, F1 cross-reference table 330, F1 trailer 340, and F1 end of file information 350.

F1 header 310 indicates that the F1 file format is being used and includes F1 identifier 312. F1 identifier 312 can indicate the F1 file format and version. For example, F1 identifier 312 can be represented as "% PDF-1.x" where x is a minor version number, from 0 to 7.

F1 object(s) 320 can include one or more objects used by the F1 file format. The object(s) can include, but are not limited to, one or more: null objects, Boolean objects, integer objects, real objects, name objects, string objects, array objects, dictionary objects, external objects, form external objects, group external objects, and/or reference external objects. A null object represents something missing from F1 formatted file 300. A Boolean object, an integer object, and a real object respectively represent Boolean-valued, integer-valued, and real-valued data items. Name and string objects represent sequences of 8-bit bytes that can represent characters, where a name object represents a unique sequence of characters that can begin with a "/" character, and where a string object represents an arbitrary sequence of 0 or more 8-bit bytes. An array object is a collection of other objects enclosed in square brackets and separated by white space. A dictionary object is a collection of key-value pairs, where a key of a key-value pair can be a name, and where a value of the key-value pair can be an object. In practice, an object stored in a dictionary entry is intended to be referred to by the key.

An external object (also termed a "stream" object) is a graphics object whose contents are defined in a self-contained stream, separate from the content stream in which it is used; e.g., an image external object including a digital photograph or another image. A form external object can be an object including a self-contained description of an arbitrary sequence of graphics objects. A group external object can be an object including a group of objects. And, a reference external object can be an object including one or more references to other objects. Collectively, F1 object(s) 320 can be termed a "body" of F1 formatted file 300.

F1 cross-reference table 330 can have one or more sections, where each section of F1 cross-reference table 330 stores locations of F1 object(s) 320 in the body of F1 formatted file 300. More particularly, a section of F1 cross-reference table 330 can include a first object number referred to by the section of F1 cross-reference table 330 and a count of objects referred to by F1 cross-reference table 330. Then, F1 cross-reference table 330 can include a cross-reference table entry for each object referred to by F1 cross-reference table 330. A cross-reference table entry for an object can include a byte offset to the beginning of the object, an object generation value indicating the "generation" or version of the object (often 0 for valid objects or 65535 for invalid objects), and a free/use flag indicating whether the object is "free" or not used or "used" or actually used in F1 formatted file 300. As such, FIG. 3 uses an arrow to show that F1 cross-reference table 330 refers to F1 object(s) 320 in the in the body of F1 formatted file 300.

F1 trailer 340 can include a dictionary object that provides general information about F1 formatted file 300; e.g., size information that indicates how many entries are in F1 cross-reference table 330. F1 end of file information 350 can include root information that locates the first cross-reference table in the document; e.g., a location of F1 cross-reference table 330. As such, FIG. 3 uses an arrow to show that F1 end of file information 350 refers to F1 cross-reference table 330.

Figure 4:
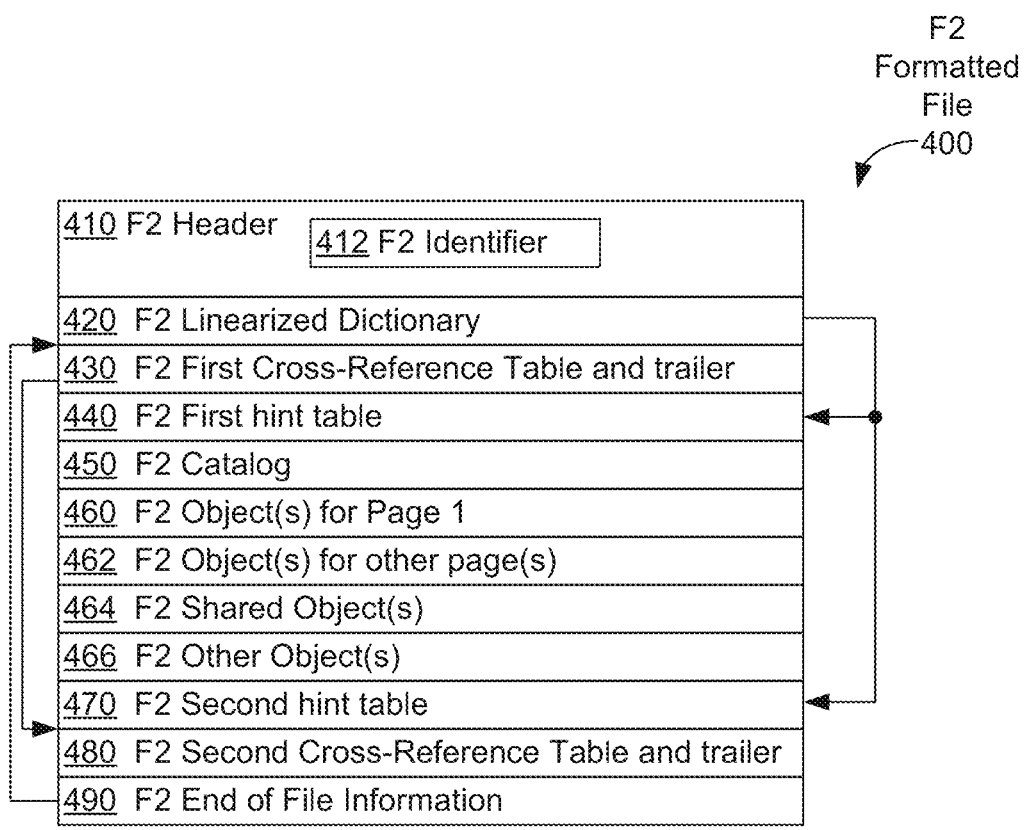
FIG. 4 is a block diagram illustrating a file encoded using a second format, according to example embodiments.

FIG. 4 is a block diagram illustrating F2 formatted file 400 encoded using a F2 file format, according to example embodiments. Another term for the F2 file format used herein is the linearized PDF file format. The linearized PDF file format is designed to provide relatively-quick access for opening a first page of a linearized PDF file (or F2 formatted file), for display or other processing in comparison to the non-linearized PDF file format. The first page to be displayed or otherwise processed may be an arbitrary page of the document, not necessarily page 0 (though opening at page 0 is most common). The linearized PDF file format is designed to display or otherwise process a later-requested page of the linearized PDF file (e.g., by receiving user or other input to go the next page or to follow a link to an arbitrary page) relatively-quickly as well, in comparison to the non-linearized PDF file format. The linearized PDF file format enables data for a data stream to be displayed as received and enables user interaction with linearized PDF pages/documents even if data for an entire page has not yet been received. Also, the linearized PDF file format is designed to be optimized for viewing of read-only PDF documents; i.e., a linearized PDF file can be generated once and read many times.

FIG. 4 shows that F2 formatted file 400 includes F2 header 410, F2 linearized dictionary 420, F2 first cross-reference table 430, F2 first hint table 440, F2 catalog 450, one or more F2 objects for page 1 460, one or more F2 objects for zero or more pages other than page 1 462, zero or more shared F2 objects 464, zero or more F2 other objects 466, F2 second hint table 470, F2 second cross-reference table 480, F2 and F2 end of file information 490.

The F2 file format is related to, but differs from, the F1 file format. Some aspects of F1 formatted file 300 and F2 formatted file 400 are the same. For example, F2 header 410 and F2 identifier 412 can be the same as respective F1 header 310 and F1 identifier used for F1 formatted file 300. Also, objects in the F2 file format (e.g., object(s) 460, 462, 464, 466) can be the same types of objects used in the F1 file format described above at least in the context of FIG. 3.

However, the F2 file format utilizes F2 linearized dictionary 420 that is not used in the F1 file format. F2 linearized dictionary 420 can be a dictionary object that identifies F2 formatted file 400 as being linearized and contains various information to process a F2 formatted/linearized PDF file. For example, FIG. 4 uses arrows to show that information in F2 linearized dictionary 420 can include references to F2 first hint table 440 and F2 second hint table 470.

A hint table, such F2 first hint table 440 or F2 second hint table 470, can act as a cross-reference table to provide location information about objects in F2 formatted file 400, but has a difference syntax than used in a cross-reference table; e.g., F2 first cross-reference table 430 or F2 second cross-reference table 480.

Also, the F2 file format can arrange objects in the body of an F2 formatted file, such as F2 formatted file 400, such that all objects for a particular page are grouped together and then organized in numerical page order (e.g., objects for page 1, then objects for page 2, etc.). As shown in FIG. 4, objects of F2 formatted file 400 places object(s) 460 for page 1 before object(s) 462 for any other pages for than page 1.

In some examples, objects in F2 formatted file 400 can be organized as a tree of objects, each of which ultimately refers to a "root" object. In some of these examples, the root object can be a "catalog" or dictionary object, such as F2 catalog 450. F2 catalog 450 has at least two key-value pairs: a first key-value pair whose key is "Type" and whose value will always be the name object "Catalog", and a second key-value pair whose key is "Pages" and whose value is an indirect reference to a tree of pages of F2 formatted file 400. The catalog can also include other information such as, but not limited to, metadata, actions, forms, logical structures and tags, and other content.

Also, the F2 file format uses F2 first cross-reference table 430 as a partial cross-reference table and trailer placed near the beginning of F2 formatted file 400 to enable access to all objects needed by the root object, F2 object(s) 460 for Page 1 of F2 formatted file 400, and F2 second cross-reference table 480. F2 second cross-reference table 480 refers to objects not on page 1; e.g., some or all of F2 object(s) 462, 464, and/or 466 that are not on a first page of F2 formatted file 400.

F2 end of file information 490 can include root information that locates the first cross-reference table in the document; e.g., a location of F2 first cross-reference table 430. As such, FIG. 4 uses an arrow to show that F2 end of file information 490 refers to F2 first cross-reference table 430.

Figure 5:
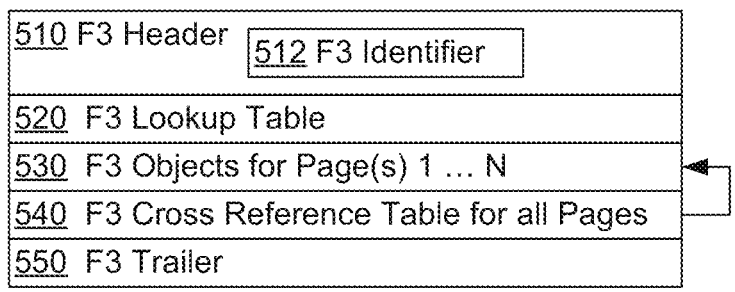
FIG. 5 is a block diagram illustrating a file encoded using a third format, according to example embodiments.

FIG. 5 is a block diagram illustrating F3 formatted file 500 encoded using a F3 file format, according to example embodiments. Another term for the F3 file format used herein is the Smart PDF file format. F3 formatted file 500 includes F3 header 510, F3 lookup table 520, one or more F3 objects 530, F3 cross-reference table for all pages 540, and F3 trailer 550.

F3 header 510 includes F3 identifier 512. F3 identifier 512 can indicate that F3 formatted file 500 is compatible with the F3 file format.

F3 lookup table 520 can store at least location information for each object in F3 formatted file 500. More particularly, F3 lookup table 520 can be a dictionary object, or similar object, with entries that store location information for each object in F3 formatted file 500; i.e., each object of F3 object(s) 530. For example, an entry E1 in F3 lookup table 520 for an object LTOBJ can be a key value pair that includes a name or other identifier for LTOBJ as the key of entry E1 and can have an offset, such as a byte offset, from the beginning of F3 formatted file 500 for LTOBJ as the value for entry E1. In some examples, an entry in F3 lookup table 520 can include a per-object reference count. A reference count for an object in F3 lookup table 520 can keep track of a number of times that the object is used in F3 formatted file 500. In operation, the computing device can initialize the reference count for an object to 1 at a first time the object is used in F3 formatted file 500 and can increment the reference count for the object by 1 each subsequent time the reference count is used in F3 formatted file 500. In some examples, F3 header 510 and/or F3 lookup table 520 can include size information for F3 formatted file 500 indicating an amount of bytes (or other measure of computer storage) used to store F3 formatted file 500.

In some examples, the entries in F3 lookup table 520 referring to F3 object can be sorted by key or can be sorted by values (i.e., offsets into F3 formatted file 500). Also, F3 lookup table 520 can track pages of F3 formatted table—for example, F3 lookup table 520 can include an entry for each page of F3 formatted file 500 that identifies the page and includes an offset to the beginning of the page. In some examples, F3 lookup table 520 can have a header section with size information and/or cross-reference information about F3 formatted file 500 or for a file related to F3 formatted file 500; e.g., a file previously formatted using another file format that was converted/encoded in F3 format to be F3 formatted file 500.

As F3 lookup table 520 is stored directly after F3 header 510, locating F3 lookup table 520 from the beginning of F3 formatted file 500 merely involves finding F3 lookup table 520 at an offset within F3 formatted file that is directly after F3 header 510. And, as F3 lookup table 520 stores offsets for each object in F3 formatted file 500, locating F3 lookup table 520 enables accessing each object in F3 formatted file 500.

F3 object(s) 530 can include one or more objects used by the F3 file format. Objects in the F3 file format (e.g., F3 object(s) 530) can be the same types of objects used in the F1 file format and the F2 file format described above at least in the context of FIGS. 3 and 4. F3 object(s) 530 can be stored within F3 formatted file 500 on a per-page basis in numerical page order; that is, F3 object(s) start with objects of page 1 of F3 formatted file 500, followed by objects of page 2 of F3 formatted file 500, and so on, until ending with objects for the last page of F3 formatted file 500. Also, if an object of F3 object(s) 530 is referred to multiple times within F3 formatted file 500, that object can be stored once with the first page that refers to that object. Further, resource object definitions within F3 object(s) can be moved to the page where they are first referenced or used; thereby enabling packaging all resources needed to render or view a page in a single package. This packaging of resources can enable pages to be processed independently of other pages.

F3 cross-reference table 540 and F3 trailer 550 are provided for backwards compatibility with the F1 file format and F2 file format. As such, F3 cross-reference table 540 can have the same format as F1 cross-reference table 330. Also, F3 trailer 550 can have the same format as F1 trailer 340. In some examples, F3 trailer 550 can also include information that locates F3 cross-reference table 540; i.e., F3 trailer 550 can include similar information to F1 end of file information 350.

Comparing the F1 file format/non-linearized PDF file format, the F2 file format/linearized PDF file format, and the F3 file format/Smart PDF file format, the F3 file format enables fast access to pages like the F2 file format while maintaining the relative simplicity of the F1 file format.

For a file encoded using the F1 file format, data in the body of the F1 formatted file can contain pages of the F1 formatted file in sequential order, where page 1 appears first and is followed by subsequent pages. FIG. 3 shows that a bottom of the F1 formatted file includes F1 cross-reference table 330 and F1 end-of-file information 350 referring to F1 cross-reference table 330. F1 cross-reference table 330 can contain offsets of the F1 formatted file to locate the above-mentioned drawing commands, objects, other data and dictionaries, where an offset can be a byte position or address within the F1 formatted file. Thus, to use F1 cross-reference table 330 in processing a F1 formatted file, F1 end-of-file information 350 referring to F1 cross-reference table 330 at the bottom of the F1 formatted file has to be read. In some cases, F1 cross-reference table 330 is also near the bottom of the F1 formatted file, and so the entire F1 formatted file must be available to process the F1 formatted file.

Reading the end of file information of a linearized PDF file first (e.g., F1 end-of-file information 350) can be problematic in a networking context, because the software reader has to wait for a non-linearized or linearized PDF file is downloaded entirely to read the end-of-file information. The delay can be important, especially for files that contain hundreds of pages or a lot of high-resolution images, or for users with a slow Internet connection.

Linearization addresses some of these delay-related concerns by using a linearized dictionary. FIG. 4 shows F2 linearized directory 420 is located near a beginning of F2 formatted file 400. Also, a linearized PDF file places objects related to the first page (and the root object) near the beginning of the file. This way, a software reader of a linearized PDF file can find the linearization dictionary, fetch the hint tables and render the first page quickly. The software reader can continue to download the linearized PDF file while the first page of the linearized PDF file is being displayed or otherwise being processed. Once the download is finished, the software reader can enable access to the full document. However, linearization is added in parallel to the regular, non-linearized structure of PDF files. This leads to linearization introducing redundancy and complexity to the linearized file format in comparison to the non-linearized PDF file format. For example, a comparison of FIG. 3 (showing the F1 file format/non-linearized PDF file format) with FIG. 4 (showing the F2 file format/linearized PDF file format) indicates that hint tables are redundant with cross-reference tables and the non-linearized PDF file format does not have the linearization directory of the non-linearized PDF file format.

In a Smart PDF file, such as F3 formatted file 500, objects in the PDF file can be arranged in order to make the resources immediately accessible to each page that requires them. That is, resource object definitions of a Smart PDF file are moved to the first page where they are referenced or used, which is not always true for non-linearized or linearized formatted files. Defining resource objects on the first page used allows for packaging all resources needed to render or view a page in a single package, thereby allowing independent transmission of pages of a document stored in the F3 file format/Smart PDF file format.

The F3 format as illustrated in FIG. 5 shows that new entries in the file that makes the needed resources for page 1 and each subsequent page available immediately for the page that need them. The new entry is a lookup table that is added at the top of the file, similar to the hint tables for linearized PDF. The difference is that the lookup tables stores offset to resources that are calculated from the top of the file, so that a first offset reference to an object is valid (and can be the same as) a later reference to the object; e.g., from a different page than first referenced the object. Further, by comparing FIGS. 4 and 5, the F3 file format/Smart PDF file format is simpler than the F2 file format/linearized PDF file format, in the number of different data structures used. Rather, by comparing FIGS. 3 and 5, the F3 file format/Smart PDF file format appears to be about as complex as the F1 file format/non-linearized PDF format. Thus, Smart PDF file format combines desirable features of both the linearized PDF file format and the non-linearized PDF file format, while addressing shortcomings of both of these other file formats.

Figure 6:
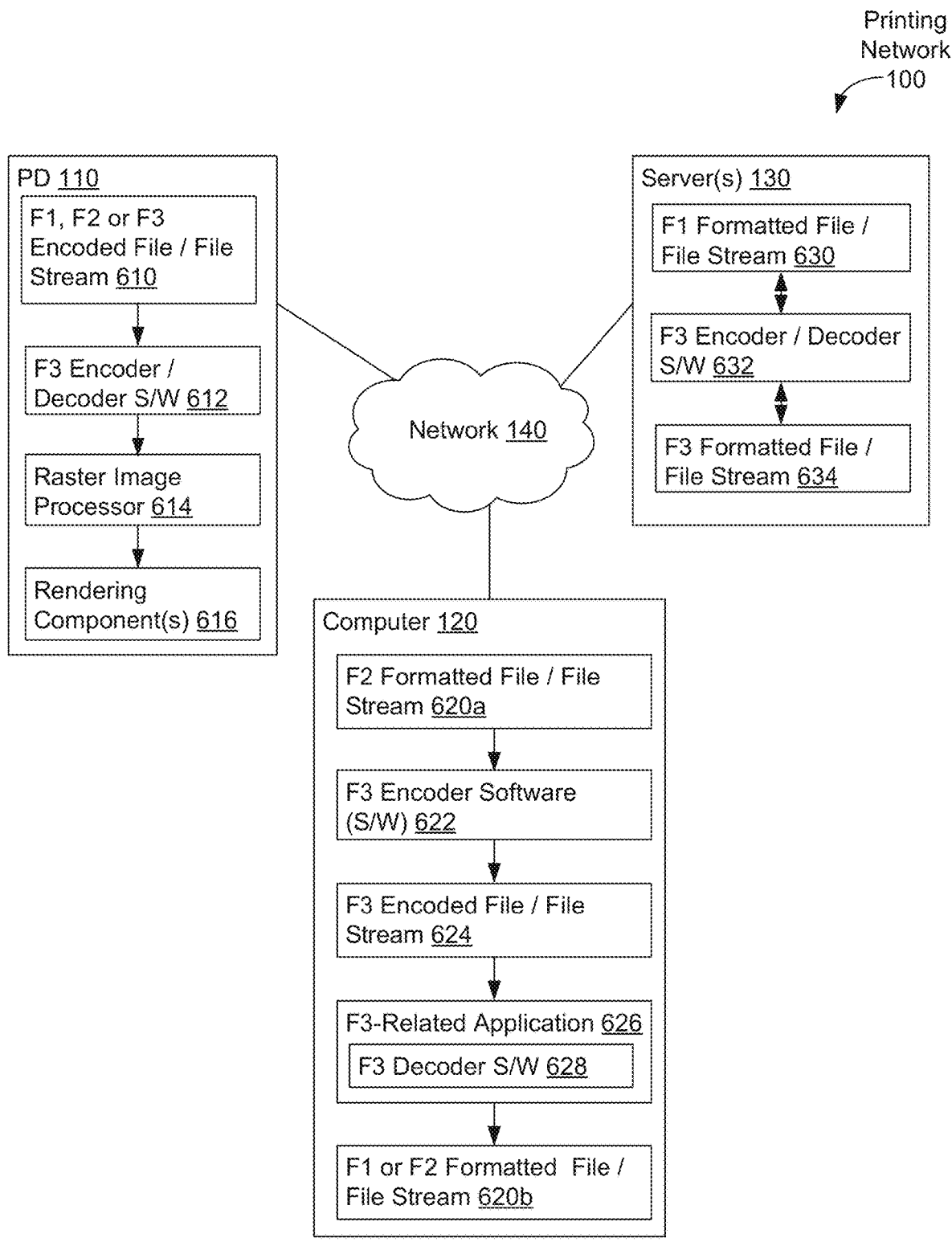
FIG. 6 is a diagram of a portion of the printing network of FIG. 1, according to example embodiments.

FIG. 6 is a diagram of a portion of printing network 100, according to example embodiments. In particular, FIG. 6 shows printing device 110, computer 120, and server(s) 130 connected by network 140. In other examples, printing network 100 can include more, fewer, and/or different printing devices, computers, servers, and/or other devices than shown in FIG. 1 and/or FIG. 6.

FIG. 6 shows that printing device 110 includes F1, F2, or F3 formatted file/file stream 610, F3 encoder/decoder software (S/W) 612, raster image processor 614, and rendering component 616, that computer 120 includes F2 formatted file/file streams 620a, 620b, F3 encoder software 622, F3 formatted file/file stream 624, and F3-related application 626; and that server(s) 130 includes F1 formatted file/file stream 630, F3 encoder/decoder software 632, and F3 formatted file/file stream 634. Each of file/file streams 610, 620a, 620b, 624, 630, 634 can be a file or a file stream of information formatted using one file format; e.g., either the herein-described F1 file format, the herein-described F2 file format, or the herein-described F3 file format as mentioned above.

F3 encoder software 622 can embody a herein-described encoder function to encode data from the F1 file format or the F2 file format, examples of encoder-input formats, to the F3 file format, an example of an encoder-output format, F3 decoder software 628 can embody a herein-described decoder function to decode data from the F3 file format (an example of a decoder-input format, which may be the same as the encoder-output format described immediately above) to the F1 file format or the F2 file format, examples of decoder-output formats, which may be the same as the encoder-input formats described immediately above), and F3 encoder/decoder software 612 can embody both a herein-described encoder function and a herein-described decoder function. As such, some or all of F3 encoder/decoder software 612, F3 encoder software 622, and F3 encoder/decoder software 632 can be part or all of a software application configured at least to encode data from the F1 file format or the F2 file format to the F3 file format. In some of these examples, some or all of F3 encoder/decoder software 612, F3 encoder software 622, and F3 encoder/decoder software 632 can be a plug-in of a software application that supports encoding (or formatting) data into the F3 file format. In some of these examples, F3 encoder/decoder software 612 and/or F3 encoder/decoder software 632 can be part or all of a software application configured at least to encode data from the F1 file format or the F2 file format to the F3 file format and vice versa. Also, F3 decoder software 628 is shown in FIG. 6 as being part of F3-related application 626. In some examples, F3 decoder software 628 can be a plug-in of F3-related application 626 that supports decoding data that was previously encoded (or formatted) in the F3 file format.

FIG. 6 shows that printing device 110 can receive F1, F2, or F3 formatted file/file stream 610 and use F3 encoder/decoder software 612 to convert F1, F2, or F3 formatted file/file stream 610 to a format (e.g., the F1 file format, the F2 file format, the F3 file format, a stream of commands) that raster image processor 614 and/or rendering components 616 can use to print the data of F1, F2, or F3 formatted file/file stream 610 to paper. In other examples, printing device 110 can receive F1, F2, or F3 formatted file/file stream 610 and use F3 encoder/decoder software to convert F1, F2, or F3 formatted file/file stream 610 to another file format (e.g., convert a F1 (or F2) formatted file to a F3 formatted file, convert an F3 formatted file stream to a F1 formatted file stream), and store, communicate, display and/or otherwise provide the converted file/file stream.

FIG. 6 shows that computer 120 can receive F2 formatted file/file stream 620a and use F3 encoder software 622 to convert F2 formatted file/file stream 620a to F3 encoded file/file stream 624. Then, computer 120 can use F3 decoder software 628 of F3-related application 626 to convert F3 encoded file/file stream 624 to F1 or F2 formatted file/file stream 620b. In some examples, computer 120 can receive F2 formatted file/file stream 620a and use F3 encoder software 622 to convert F2 formatted file/file stream 610 to F3 encoded file/file stream 624 and store, communicate, display and/or otherwise provide F3 encoded file/file stream 624 without creating F1 or F2 formatted file/file stream 620b. In some examples, computer 120 can receive F3 formatted file/file stream 624 and use F3 decoder software 628 of F3-related application 626 to convert F3 encoded file/file stream 624 to F1 or F2 formatted file/file stream 620b and store, communicate, display and/or otherwise provide F1 or F2 formatted file/file stream 620b without receiving F2 formatted file/file stream 620a.

FIG. 6 shows that server(s) 130 can receive F1 formatted file/file stream 630 and convert F1 formatted file/file stream 630 into F3 formatted file/file stream 634 using F3 encoder/decoder software 632. FIG. 6 also shows that server(s) 130 can receive F3 formatted file/file stream 634 convert F3 formatted file/file stream 634 into F1 formatted file/file stream 630 using F3 encoder/decoder software 632.

In some examples, F3-related application 626 can be a web browser application, a document review and/or editing application, or a printer driver. In some examples, server(s) 130 can include a network file server, a print server, or another server (e.g., a web server) that uses encoder/decoder software 632 to convert files, file streams, and/or data streams between file formats upon receipt of an explicit request for file conversion (e.g., a request to convert a file to the F3 file format) or implicitly (e.g., conversion of a subset of a non-linearized PDF file to a data stream in F3 file format as part of a policy to reduce bandwidth).

Figure 7:
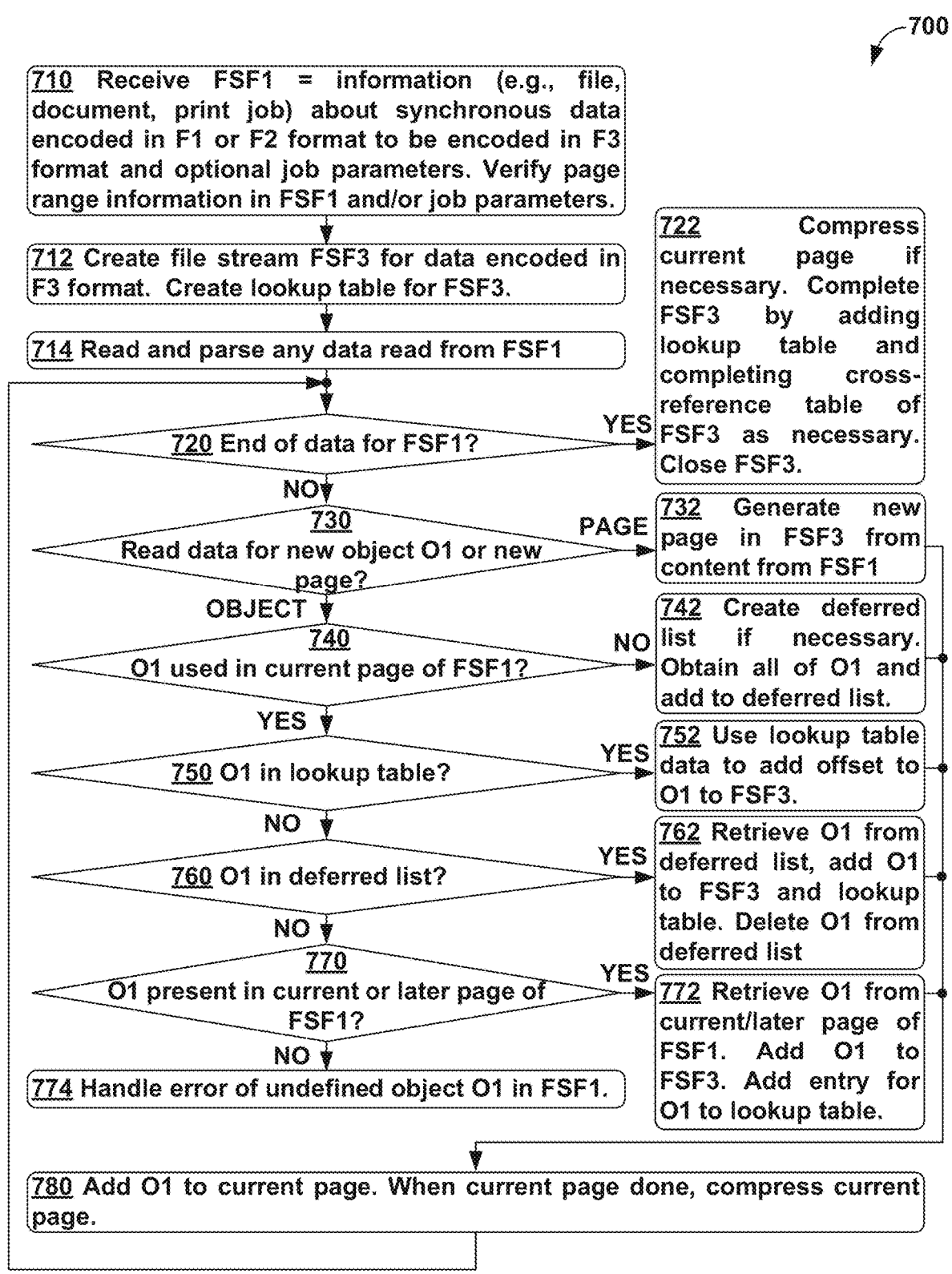
FIG. 7 shows a flowchart for a method for converting a file formatted using either the format of FIG. 3 or the format of FIG. 4 to a file formatted using the format of FIG. 5, according to example embodiments.

FIG. 7 shows a flowchart for method 700 for converting information formatted in either the F1 file format or the F2 file format, examples of encoder-input formats, into a file stream formatted using the F3 file format, an example of an encoder-output format (and also a decoder-input format), according to example embodiments. Method 700 can be carried out by a computing device, such as computing device 200. In some examples, method 700 can be carried out by a printing device, such as printing device 110, printing device 112, and/or printing device 114.

The procedures of method 700 will convert the F1 formatted data or F2 formatted data in FSF1 to F3 format stored in a file FSF3. In some examples, method 700 can be used by an encoder function to encode files in the F3 file format/Smart PDF file format from input files in either the F1 file format/non-linearized PDF file format or the F2 file format/linearized PDF file format.

As part of creating the file stream using the F3 file format, method 700 will sort the objects formatted in either the F1 file format or the F2 file format into the order they appear or are referenced in pages of the input. For example, objects used in input page 1 will be rearranged to page 1 of the file stream using the F3 file format, resources used in input page 2 will be rearranged to page 2 of the file stream using the F3 file format, and so on.

Method 700 can begin at block 710, where the computing device can receive FSF1, which can be information (e.g., a file, a file stream, a memory object) having synchronous data encoded in the F1 file format or the F2 file format and optional job parameters. The optional job parameters can include, but are not limited to, one or more page ranges of FSF1 to be processed, output parameters (e.g., if FSF3 is to be printed, stored, displayed, communicated, etc.), a printing device to print FSF3 (as necessary), a name of FSF3, a format of FSF1 (e.g., an indication of whether FSF1 is in F1 file format or F2 file format). Some of these parameters can be implicit; e.g., an application that displays files can display FSF3 as an output without a specific output parameter, a printing device that prints files to paper can print FSF3 to paper without specific related output parameters. Other job parameters are possible as well. The computing device can verify these job parameters as necessary.

In some examples, the computing device can verify that FSF1 is in F1 file format/non-linearized PDF file format or in F2 file format/linearized PDF file format at block 710 as well by examining a header and/or a linearized dictionary of FSF1 for information identifying FSF1 as being in F1 file format/non-linearized PDF file format or in F2 file format/linearized PDF file format. If the computing device does not verify that FSF1 is either in in F1 file format/non-linearized PDF file format or in F2 file format/linearized PDF file format, then the computing device can terminate method 700.

At block 712, the computing device can create file stream FSF3 for data encoded in F3 format and can create a lookup table for file stream FSF3; e.g., a lookup table as described as F3 lookup table 520. In some examples, FSF3 can include a copy of the cross-reference table of FSF1, perhaps as part of F3 cross-reference table 540 for flexibility and backward compatibility.

In some examples, the computing device can otherwise initialize FSF3 at block 712; e.g., create and/or initialize: a header of FSF3 such as described as F3 header 510, a trailer of FSF3 such as described as F3 trailer 550, and/or a cross-reference table of FSF3 such as described for F3 cross-reference table 540.

At block 714, the computing device can attempt to read data from file stream FSF1 and parse any data read from F SF1. All attempts to read data from FSF1 can take the page range(s) and/or other job parameters provided at block 710 into account. That is, if page ranges were not provided with the optional job parameters, then the computing device can use an implicit page range that includes all pages of FSF1. Then, the computing device can generate a list of pages to be processed by combining the page range(s), including any implicit page ranges. The computing device can determine whether a page read from FSF1 is in a page range by determining a page number for a page read from FSF1 and comparing that page number to the list of pages to determine if the page number is on the list of pages. Then, the computing device can attempt to read data only for pages on the list of pages within FSF1 at block 710 and throughout method 700. In some examples, the computing device can add size and/or cross-reference information from FSF1 to FSF3; e.g., add size and cross-reference information to a header of the lookup table of FSF3, copy a cross-reference table from FSF1 to FSF3.

At block 720, the computing device can determine whether an end of data condition has been reached for file stream FSF1. For example, if a read of file stream FSF1 fails with an end of data error, end of file error, or a similar error, then the computing device can determine that the end of data condition has been reached for file stream FSF1. If the end of data condition has been reached for file stream FSF1, then the computing device can proceed to block 722. Otherwise, the computing device can determine that the end of data condition has not been reached for file stream FSF1 and proceed to block 730.

At block 722, the computing device can compress a current page of FSF3, if necessary. The computing device can use the ZIP compression algorithm or another suitable compression algorithm to compress data for method 700. Then, the computing device can complete FSF3; e.g., if necessary, add the lookup table to FSF3 as F3 lookup table 520, complete F3 cross-reference table 540 using offsets into FSF3, and/or add F3 trailer 550. After FSF3 is completed, the computing device can close FSF3. After FSF3 is closed the computing device can process FSF3 according to the output parameters (including implicit output parameters) discussed in the context of block 710 as necessary; that is, print part or all of FSF3, store part or all of FSF3, display part or all of FSF3, communicate part or all of FSF3, etc. After performing any output processing of FSF3, the computing device can terminate method 700.

At block 730, the computing device can attempt to read data from file stream FSF1 and parse any data read from FSF1. While attempting to read data, the computing device can take the page range(s) and/or other job parameters into account as discussed above in the context of block 714. After attempting to read and parse data from file stream FSF1, the computing device can determine whether the data read from FSF1 is data for a new object O1 or for a new page. If the data read from FSF1 is data for a new object O1, the computing device can proceed to block 740. Otherwise, the computing device can determine that the data read from FSF1 is data for a new page and proceed to block 732.

At block 732, the computing device can generate or otherwise add a new page in FSF3 based on content read from FSF1. The computing device can retrieve page number information from FSF1 and add a new page in FSF3 whose page number is based on the page number information from FSF1. Further, the computing device can parse and process content read from FSF1 including headers and drawing commands of the new page and add the processed content to the new page of FSF3. In some examples, the computing device can add an entry for the new page to the lookup table for FSF3. In some examples, the computing device can parse and process other content, such as content related to external objects, font dictionaries, color dictionaries, patterns, etc. from FSF1 and add the processed other content to FSF3. Upon completion of block 732, the computing device can proceed to block 780.

At block 740, the computing device can determine whether object O1 is used in the current page of FSF1; e.g., by examining drawing and/or other commands of the current page of FSF1 to determine whether or not O1 is used by the drawing and/or other commands. If object O1 is used in the current page of FSF1, then the computing device can proceed to block 750. Otherwise, the computing device can determine that O1 is not used in the current page of FSF1 and proceed to block 742.

At block 742, the computing device can create a deferred list of objects if necessary; that is, the deferred list can be created if not previously created. Then, the computing device can read data for all of object O1 from FSF1 and add object O1 to the deferred list. By adding O1 to the deferred list, method 700 effectively caches O1 until O1 is referenced in a subsequent page. Upon completion of block 742, the computing device can proceed to block 780.

At block 750, the computing device can determine whether object O1 is in the lookup table of FSF3; e.g., by using an identifier of object O1 as a key to perform a search for O1 in the lookup table. If O1 is in the lookup table, then the computing device can proceed to block 752. Otherwise, the computing device can determine that O1 is not in the lookup table and proceed to block 760.

At block 752, the computing device can retrieve data about object O1 from the lookup table, such as offset data about where O1 resides in FSF3. Then, the computing device can add the offset to object O1 to FSF3. That is, the computing device can add an offset to O1 to FSF3 rather than adding another copy of O1 to FSF3 at block 752. By adding offsets rather than copies of object to FSF3, method 700 removes redundant copies of objects from FSF3. In some examples, the lookup table can include per-object reference counts; then, the reference count for object O1 can be incremented by 1 at block 752, as a reference to object O1 has been added to FSF3. Upon completion of block 752, the computing device can proceed to block 780.

At block 760, the computing device can determine whether object O1 is in the deferred list; e.g., by searching the deferred list for an identifier of object O1. If object O1 is in the deferred list, then the computing device can proceed to block 762. Otherwise, the computing device can determine that object O1 is not in the deferred list, and proceed to block 770.

At block 762, the computing device can retrieve object O1 from the deferred list, add O1 to FSF3, and then delete O1 from the deferred list. The computing device can also add an entry for object O1 to the lookup table, whose key is an identifier for O1 and where the entry can store a value of a byte offset from the beginning of FSF3 to object O1. In some examples, the lookup table can include per-object reference counts; then, the reference count for object O1 can be initialized to be 1 at block 762, as object O1 has been introduced to FSF3. Upon completion of block 762, the computing device can proceed to block 780.

At block 770, the computing device can determine whether object O1 is present in the current page or a later page of FSF1; e.g., by searching for an identifier of object O1 in one or more cross-reference tables and/or hint tables of FSF1. If object O1 is present in the current or later page of FSF1, then the computing device can proceed to block 772. Otherwise, the computing device can determine that object O1 is not present in the current or a later page of F SF1, and proceed to block 774.

At block 772, the computing device can retrieve O1 from a current or later page of FSF1 and add the content of O1 to FSF3. The computing device can also add an entry for object O1 to the lookup table whose key is an identifier for O1 and where the entry can store a value of a byte offset from the beginning of FSF3 to object O1. In some examples, the lookup table can include per-object reference counts; then, the reference count for object O1 can be initialized to be 1 at block 752, as O1 has been introduced to FSF3. In some examples, the cross-reference table for FSF3 can be updated based on the byte offset from the beginning of FSF3 to object O1. Upon completion of the procedures of block 772, the computing device can proceed to block 780.

At block 774, the computing device can handle an error of object O1 being an undefined object in F SF1. For example, the computing device can handle the error by discarding object O1 and/or by displaying and/or otherwise producing an error message that object O1 is an undefined object in FSF1. Other error handling techniques can be used as well at block 774. In some examples, handling the error can include terminating method 700. In some examples, handling the error can include continuing with method 700 to convert FSF1 to the F3 file format; e.g., by proceeding to block 720.

At block 780, the computing device can add object O1 to a current page of file stream FSF3. Then, if the current page of file stream FSF3 is done, the computing device can compress the current page. Upon completion of the procedures of block 780, the computing device can proceed to block 720.

In some examples, each object of a page can be individually compressed and then all objects and any other resources used on the page can be compressed; e.g., at block 780. Performing both per-object and per-page compression can allow efficient compression depending on type of resources used on the page. In some examples, objects and/or pages are not compressed during execution of method 700; i.e., compression is not performed at block 722 and/or at block 780.

In some examples, method 700 can be used for converting standalone non-linearized or linearized PDF file to Smart PDF file format; e.g., files to be printed by a printing device prior to transmission to the printing device; files to be displayed for user review. For example, a system service in an operating system on a file server or web server can use method 700 for converting standalone non-linearized or linearized PDF files to Smart PDF file format. In another example, a plug-in to an application can carry out method 700 for converting standalone non-linearized or linearized PDF files to Smart PDF file format.

Figure 8:
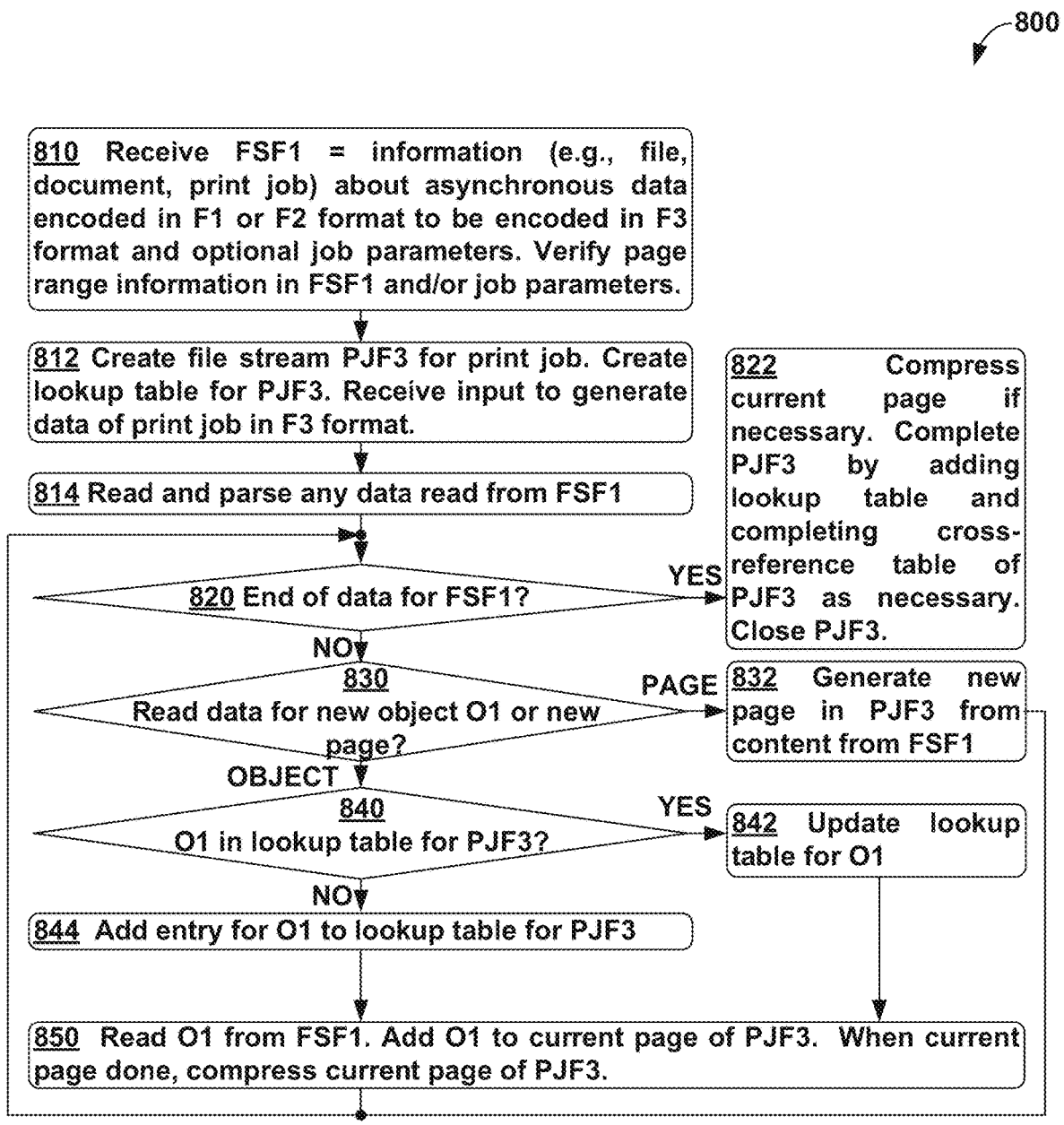
FIG. 8 shows a flowchart for another method for converting a file formatted using either the format of FIG. 3 or the format of FIG. 4 to a print job having a file formatted using the format of FIG. 5, according to example embodiments.

FIG. 8 shows a flowchart for method 800 for converting a file formatted in either the F1 file format or the F2 file format, examples of encoder-input formats, into a print job having a file formatted using the F3 file format, an example of an encoder-output format (and also a decoder-input format), according to example embodiments. Method 800 can be carried out by a computing device, such as computing device 200. In some examples, method 800 can be carried out by a printing device, such as printing device 110, printing device 112, and/or printing device 114. In some examples, method 800 can be used by an encoder function to generate print jobs that use the F3 file format/Smart PDF file format from input files in either the F1 file format/non-linearized PDF file format or the F2 file format/linearized PDF file format.

Method 800 can begin at block 810, where the computing device can receive FSF1, which can be information (e.g., a file, a file stream, a memory object) having synchronous data encoded in the F1 file format or the F2 file format and optional job parameters. In some examples, the computing device can verify that FSF1 is in F1 file format/non-linearized PDF file format or in F2 file format/linearized PDF file format at block 980 as well by examining a header and/or a linearized dictionary of FSF1 for information identifying FSF1 as being in F1 file format/non-linearized PDF file format or in F2 file format/linearized PDF file format. If the computing device does not verify that FSF1 is either in in F1 file format/non-linearized PDF file format or in F2 file format/linearized PDF file format, then the computing device can terminate method 800.

Also at block 810, the computing device can also verify as necessary received job parameters; e.g., a page range of a partial subset of FSF1 to be processed, output parameters (e.g., if print job PJF3 is to be printed, stored, displayed, communicated, etc.), a printing device to print the print job, a name of FSF1, a format of FSF1 (e.g., an indication of whether FSF1 is in F1 file format or F2 file format). Some of these parameters can be implicit; e.g., an application that displays files can display PJF3 as an output without a specific output parameter, a printing device that prints files to paper can use PJF3 to print a document to paper without specific related output parameters. Other job parameters are possible as well.

At block 812, the computing device can create file stream PJF3 for a print job having a file or other data encoded in F3 format and can create a lookup table for file stream PJF3; e.g., a lookup table as described as F3 lookup table 520. In some examples, the computing device can otherwise initialize PJF3 at block 812; e.g., create and/or initialize a F3 format header for PJF3 such as F3 header 510, a trailer for PJF3 such as described as F3 trailer 550, and/or a cross-reference table for PJF3 such as described for F3 cross-reference table 540. In some examples, the computing device can initialize PJF3 with print job information; i.e., based on the parameters received at block 810.

At block 814, the computing device can attempt to read data from file stream FSF1 and parse any data read from FSF1. All attempts to read data from FSF1 can take the page range(s) and/or other job parameters provided at block 810 into account. That is, if page ranges were not provided with the optional job parameters, then the computing device can use an implicit page range that includes all pages of FSF1. Then, the computing device can generate a list of pages to be processed by combining the page range(s), including any implicit page ranges. The computing device can determine whether a page read from FSF1 is in a page range by determining a page number for a page read from FSF1 and comparing that page number to the list of pages to determine if the page number is on the list of pages. Then, the computing device can attempt to read data only for pages on the list of pages within FSF1 at block 810 and throughout method 800. In some examples, the computing device can add size and/or cross-reference information from FSF1 to PJF3; e.g., add size and cross-reference information to a header of the lookup table of the F3 formatted portion of PJF3, copy a cross-reference table from FSF1 to PJF3.

At block 820, the computing device can determine whether an end of data condition has been reached for file stream FSF1. For example, if a read of file stream FSF1 fails with an end of data error, end of file error, or a similar error, then the computing device can determine that the end of data condition has been reached for file stream FSF1. If the end of data condition has been reached for file stream FSF1, then the computing device can proceed to block 822. Otherwise, the computing device can determine that the end of data condition has not been reached for file stream FSF1 and proceed to block 830.

At block 822, the computing device can compress a current page of PJF3, if necessary. The computing device can use the ZIP compression algorithm or another suitable compression algorithm to compress data for method 800. Then, the computing device can complete PJF3; e.g., if necessary, add the lookup table to PJF3 as F3 lookup table 520, complete F3 cross-reference table 540 using offsets into PJF3, and/or add F3 trailer 550. After PJF3 is completed, the computing device can close PJF3. After PJF3 is closed, the computing device can process PJF3 according to the output parameters (including implicit output parameters) discussed in the context of block 810 as necessary; that is, print part or all of PJF3, store part or all of PJF3, display part or all of PJF3, communicate part or all of PJF3, etc. As examples, the computing device can provide PJF3 to a printing device to be printed or can send PJF3 to a print server. After performing any output processing of PJF3, the computing device can terminate method 800.

At block 830, the computing device can attempt to read data from file stream FSF1 and parse any data read from FSF1. While attempting to read data, the computing device can take the page range(s) and/or other job parameters into account as discussed above in the context of block 814. After attempt to read and parse data from file stream FSF1, the computing device can determine whether the data read from FSF1 is data for a new object O1 or for a new page. If the data read from FSF1 is data for a new object O1, the computing device can proceed to block 840. Otherwise, the computing device can determine that the data read from FSF1 is data for a new page and proceed to block 832.

At block 832, the computing device can generate or otherwise add a new page in PJF3 based on content read from FSF1. The computing device can retrieve page number information from FSF1 and add a new page in PJF3 whose page number is based on the page number information from FSF1. Further, the computing device can parse and process content read from FSF1 including headers and drawing commands of the new page and add the processed content to the new page of PJF3. In some examples, the computing device can add an entry for the new page to the lookup table for PJF3. In some examples, the computing device can parse and process other content, such as content related to external objects, font dictionaries, color dictionaries, patterns, etc. from PJF3 and add the processed other content to FSF3. Upon completion of block 832, the computing device can proceed to block 820.

At block 840, the computing device can determine whether object O1 is in the lookup table of PJF3 to determine whether object O1 has already been used in FSF1. For example, the computing device can use an identifier of object O1 as a key to perform a search for O1 in the lookup table. If O1 is in the lookup table, then the computing device can proceed to block 842. Otherwise, the computing device can determine that O1 is not in the lookup table and proceed to block 844.

At block 842, the computing device can update the lookup table for object O1 by adding and/or updating reference information for an entry for O1 being at a current location within FSF1 where O1 is located and/or a current location within PJF3 where O1 will be located, where the entry for O1 can be the entry of the lookup table whose key is the identifier of object O1 located at block 840. In some examples, the lookup table can include per-object reference counts; then, the reference count for object O1 can be incremented by 1 at block 842, as a reference to object O1 has been added to FSF3. Upon completion of block 840, the computing device can proceed to block 850.

At block 844, the computing device can create a new entry in the lookup table for object O1, where a key of the new entry in the lookup table can be an identifier of object O1 and a value of the new entry in the lookup table can include location information for object O1; e.g., a current location within FSF1 where O1 is located and/or a current location within PJF3 where O1 will be located. In some examples, the lookup table can include per-object reference counts; then, the reference count for object O1 can be initialized to be 1 at block 844, as object O1 has been introduced to FSF3.

At block 850, the computing device can read O1 from FSF1 and add O1 to the current page of PJF3. Then, if the current page of PJF3 is done, the computing device can compress the current page of PJF3. Upon completion of block 850, the computing device can proceed to block 820.

Figure 9:
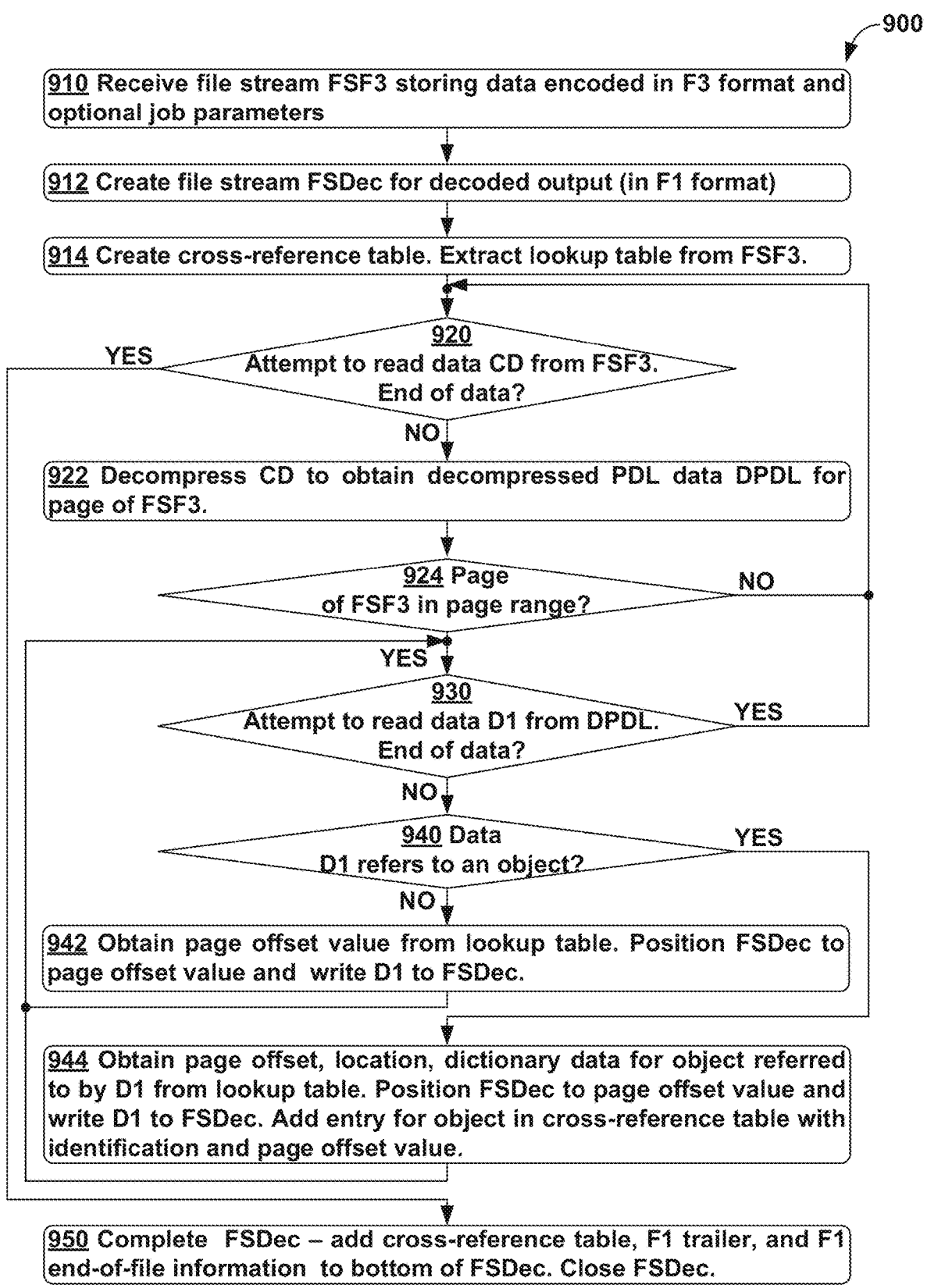
FIG. 9 shows a method for converting a file formatted using the format of FIG. 5 to a file formatted using the format of FIG. 3, according to example embodiments.

FIG. 9 shows method 900 for converting a file formatted using the F3 file format, an example of a decoder-input format (and also an encoder-output format), to a file formatted using the F1 file format, an example of a decoder output format (and also an example of an encoder-input format), according to example embodiments. Method 900 can be used to decode a F3 formatted file/Smart PDF formatted file into a F1 formatted file/non-linearized PDF file. Method 900 can provide flexibility and backward compatibility for applications and devices that utilize the Smart PDF file format. As detailed below, method 900 decompresses data for each page of an input Smart PDF formatted file and adds the decompressed data to a file stream for the decoded, non-linearized PDF file.

In some examples, the decoded, non-linearized PDF file stream can be sparse and fragmented initially. As method 900 progresses, the decoded, non-linearized PDF file stream can become less sparse and fragmented, as more pages and the related data are decompressed and added to the decoded, non-linearized PDF file stream.

Method 900 maintains the ordering of objects provided by an input F3 formatted/Smart PDF formatted file stream in an output F1 formatted/non-linearized PDF formatted file stream. Because the F3 file format orders the pages numerically, drawing commands, data and resources for the first page of the input F3 formatted file are the first drawing commands, data and resources of the output F1 formatted/non-linearized PDF formatted file stream, followed by drawing commands, data and resources of the second page and so on. This implies the first page of the output F1 formatted/non-linearized PDF formatted file stream can be processed immediately without having to wait for the entire file stream of decoded PDF file to be available and filled. Method 900 provides backward compatibility for the Smart PDF file format by converting Smart PDF formatted file streams to corresponding non-linearized PDF formatted file streams.

Method 900 can be carried out by a computing device, such as computing device 200. In some examples, method 900 can be carried out by a printing device, such as printing device 110, printing device 112, and/or printing device 114. In some examples, method 900 can be used by a decoder function to generate files in the F1 file format/non-linearized PDF file format from input files in the F3 file format/Smart PDF file format.

Method 900 can begin at block 910, where the computing device can receive file stream FSF3 storing data encoded in F3 format and optional job parameters. The optional job parameters can include, but are not limited to, one or more page ranges of FSF3 to be processed, output parameters (e.g., if FSDec is to be printed, stored, displayed, communicated, etc.), a printing device to print FSDec (as necessary), a name of FSDec, a format of FSF3 (e.g., an indication that FSF3 is in the F3 file format). Some of these parameters can be implicit; e.g., an application that displays files can display FSDec as an output without a specific output parameter, a printing device that prints files to paper can print FSDec to paper without specific related output parameters. Other job parameters are possible as well. The computing device can verify these job parameters as necessary.

In some examples, the computing device can verify that FSF3 is in F3 file format/Smart PDF file format at block 910 as well by examining a header and/or a lookup table of FSF3 for information identifying FSF3 as being in F3 format/Smart PDF file format. If the computing device does not verify that FSF3 is in F3 file format/Smart PDF file format, then the computing device can terminate method 900.

In some examples, FSF3 can be data provided in a form other than a file stream; e.g., a file, a memory object, a file for print job storing data encoded in F3 format.

At block 912, the computing device can create a file stream FSDec for decoded output; e.g., output in F1 file format that corresponds to FSF3. In some examples, after creating FSDec, the computing device can add a header for a F1 formatted file, such as F1 header 310, to FSDec as well. In some examples, the file stream FSDec can have a size that is adjustable dynamically; that is, a write to FSDec to a location L1 that is past a current end of FSDec can cause FSDec to grow to at least a size that accommodate the write to location L1. In some examples, the computing device can allocate storage for the file stream FSDec at block 912—for example, FSDec can be allocated storage based on the size of FSF3, where the size of FSF3 can be determined based on size information stored in a lookup table of FSF3.

At block 914, the computing device can create a cross-reference table for F1 formatted data; e.g., a table such as F1 cross-reference table 330, and can extract a lookup table from FSF3; e.g., a table such as F3 lookup table 520. In some examples, the computing device can extract a header from FSF3 prior to or as part of extracting the lookup table; e.g., a header such as F3 header 510, as FSF3 should be formatted such that the lookup table can be found directly after the header.

At block 920, the computing device can attempt to read data CD from FSF3. In response to the attempt to read data CD from FSF3, the computing device can determine whether an end of data condition has been reached for FSF3. For example, if the attempt to read data CD from FSF3 fails with an end of data error, end of file error, or a similar error, then the computing device can determine that the end of data condition has been reached for FSF3. If the computing device determines that an end of data condition has been reached for FSF3, then the computing device can proceed to block 950. Otherwise, the computing device can determine that an end of data condition has not been reached for FSF3 and can proceed to block 922.

At block 922, the computing device can decompress data CD to obtain decompressed PDL data DPDL for a page stored in FSF3.

At block 924, the computing device can determine whether the page decompressed from DPDL is in one or more page ranges provided with the optional job parameters. If page ranges were not provided with the optional job parameters, then the computing device can determine that the page is within an implicit page range that includes all pages of FSF3. Then, the computing device can generate a list of pages to be processed by combining the page range(s), including any implicit page ranges. The computing device can determine whether the page decompressed from DPDL is in a page range by determining a page number from the page decompressed from DPDL and comparing that page number to the list of pages to determine if the page number is on the list of pages. If the computing device determines that the page decompressed from DPDL is in the list of pages, the computing device can proceed to block 930. Otherwise, the computing device can determine that the page decompressed from DPDL is not in a page range and can proceed to block 920.

At block 930, the computing device can attempt to read data D1 from decompressed data DPDL. In response to the attempt to read data D1 from decompressed data DPDL, the computing device can determine whether an end of data condition has been reached for DPDL. For example, the computing device can keep track of an amount of data in DPDL and an amount of data that has been read from DPDL as part of method 900. Then, if the amount of data that has been read from DPDL as part of method 900 is greater than the amount of data in DPDL, then the computing device can determine that an end of data condition has been reached for DPDL. If the computing device determines that an end of data condition has been reached for DPDL, then the computing device can proceed to block 920. Otherwise, the computing device can determine that an end of data condition has not been reached for DPDL and can proceed to block 940.

At block 940, the computing device can determine whether data D1 read from DPDL refers to an object. For example, the computing device can determine whether data D1 conforms to a format for an object in F3 format; e.g., one object of F3 object(s) 530. In some examples, data D1 can include compressed data; e.g., in examples where objects are compressed, stored in a page, and the page is also compressed—then, the computing device can decompress data D1 before determining whether data D1 read from DPDL refers to an object. If D1 refers to an object, the computing device can proceed to block 944. Otherwise, the computing device can determine that D1 does not refer to an object and proceed to block 942.

At block 942, the computing device can obtain a page offset value for the page corresponding to data CD from the lookup table extracted from FSF3 at block 914. Then, the computing device can position file stream FSDec to the page offset value and write non-object data D1 to FSDec; i.e., at the page offset value position of FSDec. Upon completion of block 942, the computing device can proceed to block 930.

At block 944, the computing device can obtain page offset, location, and dictionary data for the object represented by data D1 from the lookup table extracted from FSF3 at block 914. Then, the computing device can position file stream FSDec to the page offset value and write object data D1 to FSDec; i.e., at the page offset value position of FSDec. The computing device can add an entry to the cross-reference table created at block 914 for the object represented by data D1, where a key for the entry can be an identifier for the object, and a value for the entry can be the page offset value to locate where the object is stored in FSDec. In some examples, the computing device can allocate memory for the object represented by data D1 and maintain a reference count for the object represented by data D1. For example, let object O1 be the object represented by data D1. Then, the computing device can allocate memory for O1 and initially determine the reference count for O1 by obtaining reference count information from the lookup table extracted from FSF3, where the reference count information indicates a number of times O1 is utilized in FSF3 as discussed above. Then, after object data D1 representing object O1 is written to FSDec, the reference count for O1 can be decremented by 1, and the computing device can determine whether the reference count for O1 is zero. If the reference count for O1 is zero, then the computer can deallocate the memory for object O1. Upon completion of block 944, the computing device can proceed to block 930.

At block 950, the computing device can complete file stream FSDec to be a F1 formatted file stream by: adding the cross-reference table, a F1 trailer, and F1 end-of-file information to the end of FSDec, where the F1 trailer can be a trailer such as F1 trailer 340, and where the F1 end-of-file information can be information such as F1 end-of-file information 350. After completing FSDec as a F1 formatted file, the computing device can close FSDec and then terminate method 900. In some examples, after completing FSDec, the computing device can process FSDec according to the output parameters (including implicit output parameters) discussed in the context of block 910; that is, print part or all of FSDec, store part or all of FSDec, display part or all of FSDec, communicate part or all of FSDec, etc.

Figure 10:
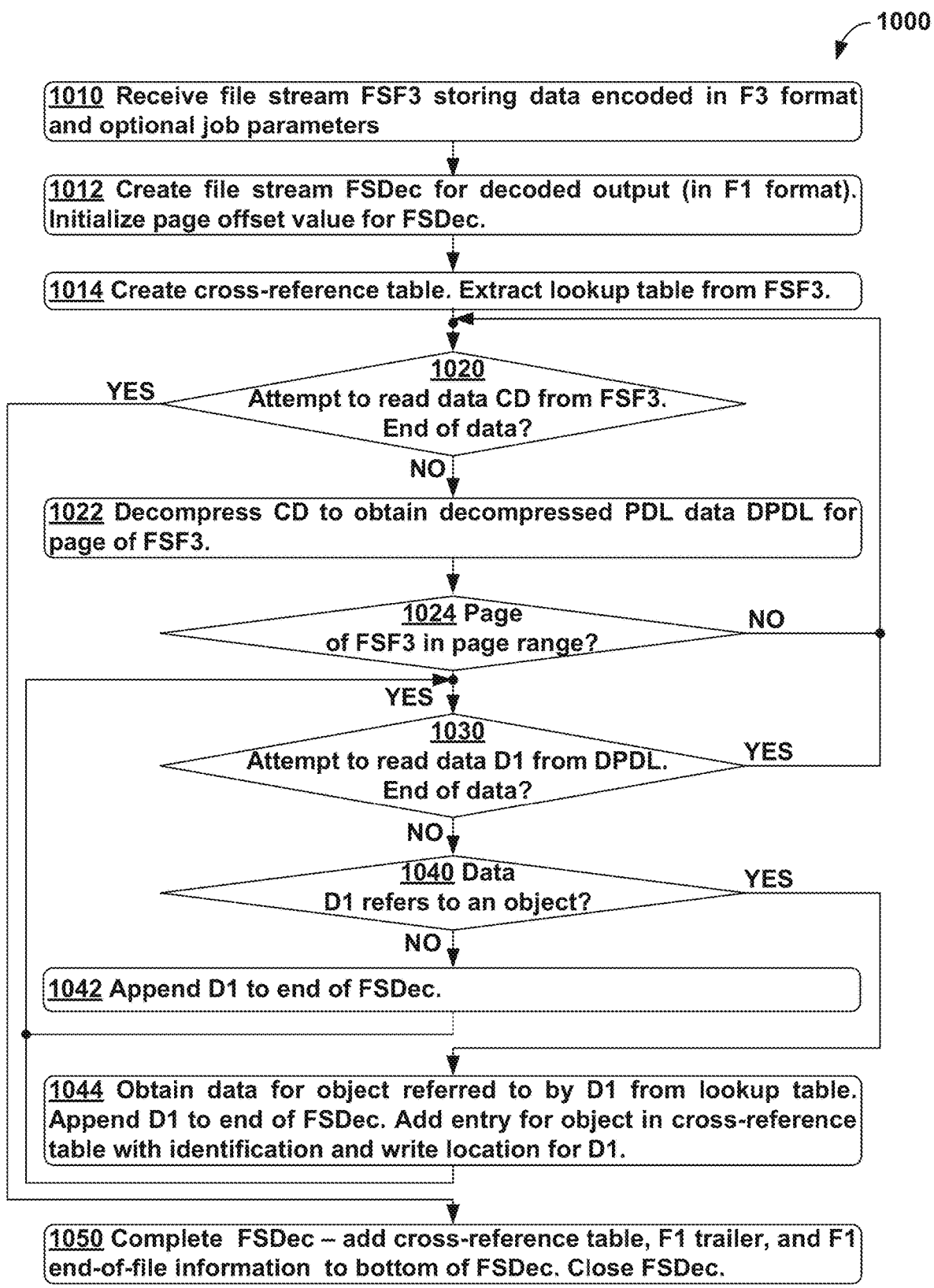
FIG. 10 shows another method for converting a file formatted using the format of FIG. 5 to a file formatted using the format of FIG. 3, according to example embodiments.

FIG. 10 shows method 1000 for converting a file formatted using the F3 file format, an example of a decoder-input format (and also an encoder-output format), to a file formatted using the F1 file format, an example of a decoder output format (and also an example of an encoder-input format), according to example embodiments. As detailed below, method 1000 can be used to decompress data for each page of an input Smart PDF formatted file to add the decompressed data to a file stream for a decoded, non-linearized PDF file.

Methods 900 and 1000 have similarities. For example, both methods 900 and 1000 provide backward compatibility for the Smart PDF file format by converting Smart PDF formatted file streams to corresponding non-linearized PDF formatted file streams. Also like method 900, method 1000 maintains the ordering of objects between an input F3 formatted/Smart PDF formatted file stream and an output F1 formatted/non-linearized PDF formatted file stream. Because the F3 file format orders the pages numerically, drawing commands, data and resources for the first page of the input F3 formatted file are the first drawing commands, data and resources of the output F1 formatted/non-linearized PDF formatted file stream, followed by drawing commands, data and resources of the second page and so on.

However, while method 900 maintains the ordering of objects between an input F3 formatted/Smart PDF formatted file stream and an output F1 formatted/non-linearized PDF formatted file stream, method 1000 does not maintain this ordering. Rather, as data for each page of the input F3 formatted/Smart PDF formatted file stream are decompressed, the decompressed data are appended to the end of the output F1 formatted/non-linearized PDF formatted file stream. By appending data to the end of the output F1 formatted/non-linearized PDF formatted file stream, method 1000 can reduce, and in some examples, eliminate, fragmentation in the output file stream. Further, file sizes of output F1 formatted/non-linearized PDF formatted file streams produced by method 1000 may be smaller than corresponding file sizes of output F1 formatted/non-linearized PDF formatted file streams produced by method 900, particularly if printing just a page range (or a subset of the pages of the original PDF document).

Method 1000 can be carried out by a computing device, such as computing device 200. In some examples, method 1000 can be carried out by a printing device, such as printing device 110, printing device 112, and/or printing device 114. In some examples, method 1000 can be used by a decoder function to generate files in the F1 file format/non-linearized PDF file format from input files in the F3 file format/Smart PDF file format.

Method 1000 can begin at block 1010, where the computing device can receive file stream FSF3 storing data encoded in F3 format and optional job parameters. The optional job parameters can include, but are not limited to, one or more page ranges of FSF3 to be processed, output parameters (e.g., if FSDec is to be printed, stored, communicated, etc.), a printing device to print FSDec (as necessary), a name of FSDec, a format of FSF3 (e.g., an indication that FSF3 is in the F3 file format). Some of these parameters can be implicit; e.g., an application that displays files can display FSDec as an output without a specific output parameter, a printing device that prints files to paper can print FSDec to paper without specific related output parameters. Other job parameters are possible as well. The computing device can verify these job parameters as necessary.

In some examples, the computing device can verify that FSF3 is in F3 file format/Smart PDF file format at block 1010 as well by examining a header and/or a lookup table of FSF3 for information identifying FSF3 as being in F3 format/Smart PDF file format. If the computing device does not verify that FSF3 is in F3 file format/Smart PDF file format, then the computing device can terminate method 1000. In some examples, FSF3 can be data provided in a form other than a file stream; e.g., a file, a memory object, a file for print job storing data encoded in F3 format.

At block 1012, the computing device can create a file stream FSDec for decoded output; e.g., output in F1 file format that corresponds to FSF3. In some examples, the computing device can allocate storage for FSDec at block 1012—for example, FSDec can be allocated storage based on the size of FSF3, where the size of FSF3 can be determined based on size information stored in a lookup table of FSF3. In some examples, after creating FSDec, the computing device can add a header for a F1 formatted file, such as F1 header 310, to FSDec as well.

At block 1014, the computing device can create a cross-reference table for F1 formatted data; e.g., a table such as F1 cross-reference table 330, and can extract a lookup table from FSF3; e.g., a table such as F3 lookup table 520. In some examples, the computing device can extract a header from FSF3 prior to or as part of extracting the lookup table; e.g., a header such as F3 header 510, as FSF3 should be formatted such that the lookup table can be found directly after the header.

At block 1020, the computing device can attempt to read data CD from FSF3. In response to the attempt to read data CD from FSF3, the computing device can determine whether an end of data condition has been reached for FSF3. For example, if the attempt to read data CD from FSF3 fails with an end of data error, end of file error, or a similar error, then the computing device can determine that the end of data condition has been reached for FSF3. If the computing device determines that an end of data condition has been reached for FSF3, then the computing device can proceed to block 1050. Otherwise, the computing device can determine that an end of data condition has not been reached for FSF3 and can proceed to block 1022.

At block 1022, the computing device can decompress data CD to obtain decompressed PDL data DPDL for a page stored in FSF3.

At block 1024, the computing device can determine whether the page decompressed from DPDL is in one or more page ranges provided with the optional job parameters. If page ranges were not provided with the optional job parameters, then the computing device can determine that the page is within an implicit page range that includes all pages of FSF3. Then, the computing device can generate a list of pages to be processed by combining the page range(s), including any implicit page ranges. The computing device can determine whether the page decompressed from DPDL is in a page range by determining a page number from the page decompressed from DPDL and comparing that page number to the list of pages to determine if the page number is on the list of pages. If the computing device determines that the page decompressed from DPDL is in the list of pages, the computing device can proceed to block 1030. Otherwise, the computing device can determine that the page decompressed from DPDL is not on the list of pages and can proceed to block 1020.

At block 1030, the computing device can attempt to read data D1 from decompressed data DPDL. In response to the attempt to read data D1 from decompressed data DPDL, the computing device can determine whether an end of data condition has been reached for DPDL. For example, the computing device can keep track of an amount of data in DPDL and an amount of data that has been read from DPDL as part of method 1000. Then, if the amount of data that has been read from DPDL as part of method 1000 is greater than the amount of data in DPDL, then the computing device can determine that an end of data condition has been reached for DPDL. If the computing device determines that an end of data condition has been reached for DPDL, then the computing device can proceed to block 1020. Otherwise, the computing device can determine that an end of data condition has not been reached for DPDL and can proceed to block 1040.

At block 1040, the computing device can determine whether data D1 read from DPDL refers to an object. For example, the computing device can determine whether data D1 conforms to a format for an object in F3 format; e.g., one object of F3 object(s) 530. In some examples, data D1 can include compressed data; e.g., in examples where objects are compressed, stored in a page, and the page is also compressed—then, computing device can decompress data D1 before determining whether data D1 read from DPDL refers to an object. If D1 refers to an object, the computing device can proceed to block 1044. Otherwise, the computing device can determine that D1 does not refer to an object O2 and proceed to block 1042.

At block 1042, the computing device can append non-object data in D1 to the end of the FSDec file system. Upon completion of block 1042, the computing device can proceed to block 1030.

At block 1044, the computing device can obtain data, such as page offset, location, and/or dictionary data, for the object represented by data D1 from the lookup table extracted from FSF3 at block 1014. Then, computing device can append the object represented by data D1 to the end of the FSDec file system. The computing device can add an entry to the cross-reference table created at block 1014 for the object represented by data D1, where a key for the entry can be an identifier for the object, and a value for the entry can be a write location in FSDec where data D1 was written to in FSDec. In some examples, the computing device can allocate memory for the object represented by data D1 and maintain a reference count for the object represented by data D1. For example, let object O1 be the object represented by data D1. Then, the computing device can allocate memory for O1 and initially determine the reference count for O1 by obtaining reference count information from the lookup table extracted from FSF3, where the reference count information indicates a number of times O1 is utilized in FSF3 as discussed above. Then, after object data D1 representing object O1 is written to FSDec, the reference count for O1 can be decremented by 1, and the computing device can determine whether the reference count for O1 is zero. If the reference count for O1 is zero, then the computer can deallocate the memory for object O1. Upon completion of block 1044, the computing device can proceed to block 1030.

At block 1050, the computing device can complete file stream FSDec to be a F1 formatted file stream by: adding the cross-reference table, a F1 trailer, and F1 end-of-file information to the end of FSDec, where the F1 trailer can be a trailer such as F1 trailer 340, and where the F1 end-of-file information can be information such as F1 end-of-file information 350. After completing FSDec as a F1 formatted file, the computing device can close FSDec and then terminate method 900. In some examples, after completing FSDec, the computing device can process FSDec according to the output parameters (including implicit output parameters) discussed in the context of block 1010; that is, print part or all of FSDec, store part or all of FSDec, display part or all of FSDec, communicate part or all of FSDec, etc.

Figure 11:
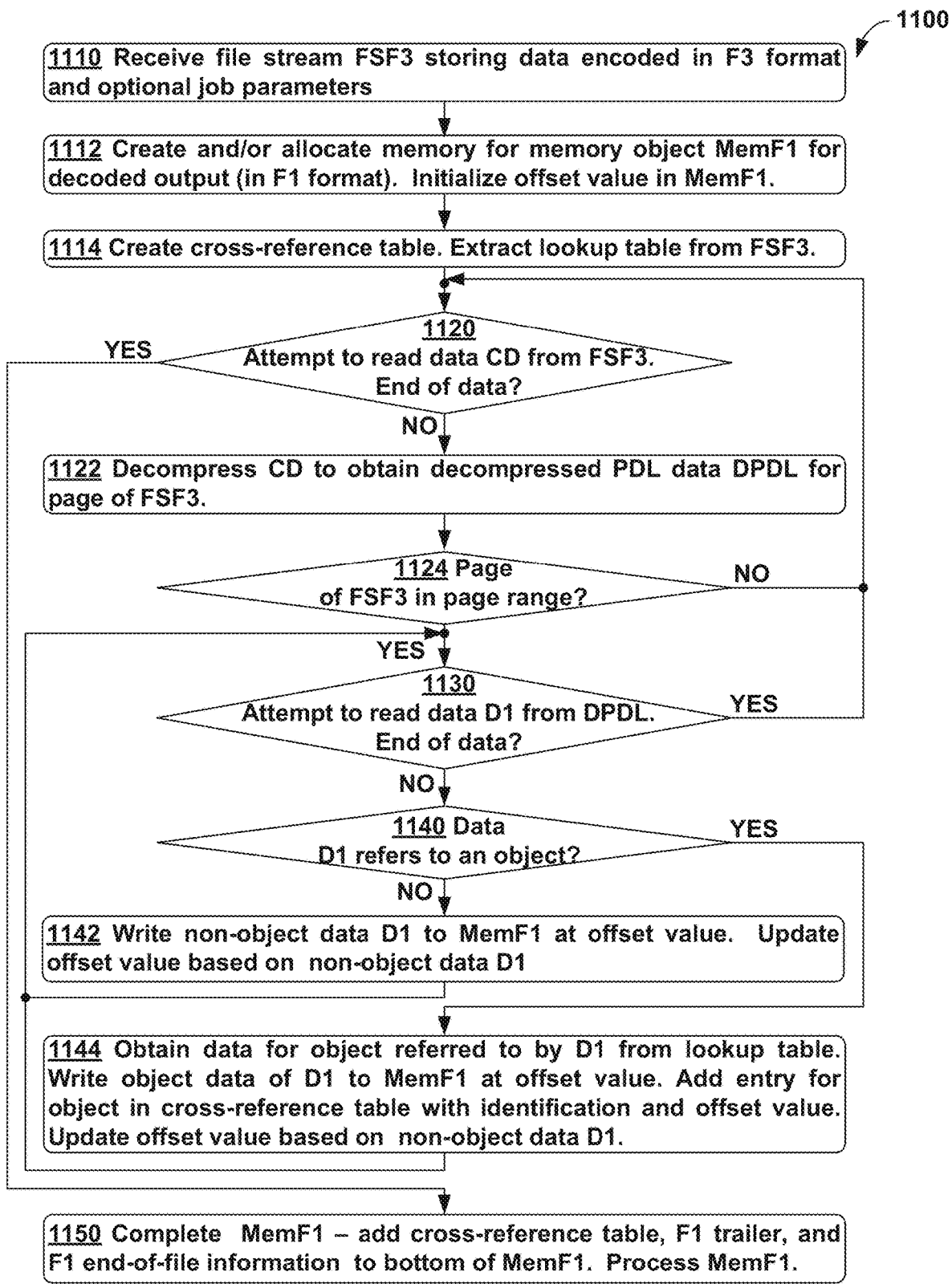
FIG. 11 shows a method for converting a file formatted using the format of FIG. 5 to a memory object formatted using the format of FIG. 3, according to example embodiments.

FIG. 11 shows method 1100 for converting a file formatted using the F3 file format, an example of a decoder-input format (and also an encoder-output format), to a memory object formatted using the F1 file format, an example of a decoder output format (and also an example of an encoder-input format), according to example embodiments. As detailed below, method 1100 can be used to decompress data for each page of an input Smart PDF formatted file to add the decompressed data to a memory object storing decoded, non-linearized PDF data.

Methods 900, 1000, and 1100 have similarities. For example, each of methods 900, 1000, and 1000 provide backward compatibility for the Smart PDF file format by converting Smart PDF formatted file streams to corresponding non-linearized PDF formatted file streams (methods 900, 1000) or memory objects (method 1100). Also like methods 900 and 1000, method 1100 maintains the ordering of objects between an input F3 formatted/Smart PDF formatted file stream and an output F1 formatted/non-linearized PDF formatted file stream. Because the F3 file format orders the pages numerically, drawing commands, data and resources for the first page of the input F3 formatted file are the first drawing commands, data and resources of the output F1 formatted/non-linearized PDF formatted file stream, followed by drawing commands, data and resources of the second page and so on.

However, while method 900 maintains the ordering of objects provided by an input F3 formatted/Smart PDF formatted file stream in an output F1 formatted/non-linearized PDF formatted file stream, neither method 1000 nor method 1100 maintains this ordering. Rather, as data for each page of the input F3 formatted/Smart PDF formatted file stream are decompressed, the decompressed data are appended to the end of the output F1 formatted/non-linearized PDF formatted file stream by method 1000 or to the end of a memory object by method 1100. By appending data to the end of the output F1 formatted/non-linearized PDF formatted file stream or memory object, both methods 1000 and 1100 can reduce, and in some examples, eliminate, fragmentation in an output file stream (method 1000) or memory object (method 1100).

Method 1100 does differ from both methods 900 and 1000 by writing output to a memory object rather than to a file stream. By writing to memory objects, method 1000 can be used as a component in software (e.g., as a plug-in or a software application), printing device firmware (e.g., RIP firmware, where the RIP is capable of extracting the PDF pages and resources needed to render the pages), and/or in other applications where writing F1 formatted/non-linearized PDF formatted data to memory objects is advantageous.

Method 1100 can reduce file input/output (I/O) operations in comparison to methods 900 and 1000, as method 1100 writes to memory objects while methods 900 and 1000 both write to file streams. Related methods to method 1100 can process input F3 formatted/Smart PDF formatted memory objects rather than the input F3 formatted/Smart PDF formatted file streams processed by method 1100 to further reduce file I/O. Additionally, any overhead or extra processing used in creating and management of output non-linearized PDF files is eliminated by method 1100's use of output memory objects.

Method 1100 can be carried out by a computing device, such as computing device 200. In some examples, method 1100 can be carried out by a printing device, such as printing device 110, printing device 112, and/or printing device 114. In some examples, method 1100 can be used by a decoder function to generate memory objects whose data are formatted using the F1 file format/non-linearized PDF file format from input files in the F3 file format/Smart PDF file format.

Method 1100 can begin at block 1110, where the computing device can receive file stream FSF3 storing data encoded in F3 format and optional job parameters. The optional job parameters can include, but are not limited to, one or more page ranges of FSF3 to be processed, output parameters (e.g., if MemF1 is to be printed, stored, communicated, etc.), a printing device to print the data in MemF1 (as necessary), a format of FSF3 (e.g., an indication that FSF3 is in the F3 file format). Some of these parameters can be implicit; e.g., an application that displays files stored in memory can display part or all of MemF1 as an output without a specific output parameter, a printing device that prints data stored in memory can print part or all of MemF1 to paper without specific related output parameters. Other job parameters are possible as well. The computing device can verify these job parameters as necessary.

In some examples, the computing device can verify that FSF3 is in F3 file format/Smart PDF file format at block 1110 as well by examining a header and/or a lookup table of FSF3 for information identifying FSF3 as being in F3 format/Smart PDF file format. If the computing device does not verify that FSF3 is in F3 file format/Smart PDF file format, then the computing device can terminate method 1100.

In some examples, FSF3 can be data provided in a form other than a file stream; e.g., a file, a memory object, a file for print job storing data encoded in F3 format.

At block 1112, the computing device can create memory object MemF1 for decoded output; e.g., output in F1 file format that corresponds to FSF3. In some examples, the computing device can statically allocate memory for MemF1 when creating MemF1; e.g., by allocating storage whose amount is determined based on size information stored in the lookup table of FSF3. In some examples, the computing device can dynamically allocate memory for MemF1 throughout method 1100.

The computing device can initialize an offset value within MemF1 for writing output data. For example, an offset value of X can indicate that output data is to be written to the Xth location (e.g., the Xth byte location) of MemF1. In some examples, after creating MemF1, the computing device can write a F1 formatted header, such as F1 header 310, to MemF1 as well and update the offset value based on the F1 formatted header.

To update the offset value based on data D1 whose size is 51, the computing device can add the size 51 to the offset value. For example, suppose that the offset value was initialized to 0 and a F1 formatted header was written to MemF1, where the F1 formatted header was 128 bytes in size. Then, the F1 formatted header can be written to byte positions 0 (the offset value) to 127 of MemF1, for a total of 127 bytes. Then, the offset value can be updated to be 0+128=128. Further suppose an additional 256 bytes of data are to be written to MemF1. Those additional bytes of data can be appended to MemF1 by writing the additional bytes of data at byte positions 128 (the offset value) to 383, for a total of 256 bytes, and the offset value can be updated to be 128+256=384. Other examples are possible as well.

At block 1114, the computing device can create a cross-reference table for F1 formatted data; e.g., a table such as F1 cross-reference table 330, and can extract a lookup table from FSF3; e.g., a table such as F3 lookup table 520. In some examples, the computing device can extract a header from FSF3 prior to or as part of extracting the lookup table; e.g., a header such as F3 header 510, as FSF3 should be formatted such that the lookup table can be found directly after the header.

At block 1120, the computing device can attempt to read data CD from FSF3. In response to the attempt to read data CD from FSF3, the computing device can determine whether an end of data condition has been reached for FSF3. For example, if the attempt to read data CD from FSF3 fails with an end of data error, end of file error, or a similar error, then the computing device can determine that the end of data condition has been reached for FSF3. If the computing device determines that an end of data condition has been reached for FSF3, then the computing device can proceed to block 1150. Otherwise, the computing device can determine that an end of data condition has not been reached for FSF3 and can proceed to block 1122.

At block 1122, the computing device can decompress data CD to obtain decompressed PDL data DPDL for a page stored in FSF3.

At block 1124, the computing device can determine whether the page decompressed from DPDL is in one or more page ranges provided with the optional job parameters. If page ranges were not provided with the optional job parameters, then the computing device can determine that the page is within an implicit page range that includes all pages of FSF3. Then, the computing device can generate a list of pages to be processed by combining the page range(s), including any implicit page ranges. The computing device can determine whether the page decompressed from DPDL is in a page range by determining a page number from the page decompressed from DPDL and comparing that page number to the list of pages to determine if the page number is on the list of pages. If the computing device determines that the page decompressed from DPDL is in the list of pages, the computing device can proceed to block 1130. Otherwise, the computing device can determine that the page decompressed from DPDL is not on the list of pages and can proceed to block 1120.

At block 1130, the computing device can attempt to read data D1 from decompressed data DPDL. In response to the attempt to read data D1 from decompressed data DPDL, the computing device can determine whether an end of data condition has been reached for DPDL. For example, the computing device can keep track of an amount of data in DPDL and an amount of data that has been read from DPDL as part of method 1100. Then, if the amount of data that has been read from DPDL as part of method 1100 is greater than the amount of data in DPDL, then the computing device can determine that an end of data condition has been reached for DPDL. If the computing device determines that an end of data condition has been reached for DPDL, then the computing device can proceed to block 1120. Otherwise, the computing device can determine that an end of data condition has not been reached for DPDL and can proceed to block 1140.

At block 1140, the computing device can determine whether data D1 read from DPDL refers to an object. For example, the computing device can determine whether data D1 conforms to a format for an object in F3 format; e.g., one object of F3 object(s) 530. In some examples, data D1 can include compressed data; e.g., in examples where objects are compressed, stored in a page, and the page is also compressed—then, computing device can decompress data D1 before determining whether data D1 read from DPDL refers to an object. If D1 refers to an object, the computing device can proceed to block 1144. Otherwise, the computing device can determine that D1 does not refer to an object O2 and proceed to block 1142.

At block 1142, the computing device can write non-object data in D1 to MemF1 at the offset value and can update the offset value based on the size of D1, such as discussed above in the context of block 1112.

At block 1144, the computing device can obtain data, such as page offset, location, and/or dictionary data, for the object represented by data CD from the lookup table extracted from FSF3 at block 1114. The computing device can write the object represented by data D1 to MemF1 at the offset value. The computing device can add an entry to the cross-reference table created at block 1114 for the object represented by data D1, where a key for the entry can be an identifier for the object and a value for the entry can the offset value. Then, the computing device can update the offset value based on the size of the object represented by data D1, such as discussed above in the context of block 1112. In some examples, the computing device can allocate memory for the object represented by data D1 and maintain a reference count for the object represented by data D1. For example, let object O1 be the object represented by data D1. Then, the computing device can allocate memory for O1 and initially determine the reference count for O1 by obtaining reference count information from the lookup table extracted from FSF3, where the reference count information indicates a number of times O1 is utilized in FSF3 as discussed above. Then, after object data D1 representing object O1 is written to MemF1, the reference count for O1 can be decremented by 1, and the computing device can determine whether the reference count for O1 is zero. If the reference count for O1 is zero, then the computer can deallocate the memory for object O1. Upon completion of block 1144, the computing device can proceed to block 1130.

At block 1150, the computing device can complete MemF1 as a memory object storing F1 formatted data by writing the cross-reference table, a F1 trailer, and F1 end-of-file information at the offset value of MemF1, where the F1 trailer can be a trailer such as F1 trailer 340, and where the F1 end-of-file information can be information such as F1 end-of-file information 350. In some examples, the computing device can then update the offset value based on the cross-reference table, a F1 trailer, and F1 end-of-file information, such as discussed above in the context of block 1112. In some examples, after completing MemF1, the computing device can process MemF1 according to the output parameters (including implicit output parameters) discussed in the context of block 1110; that is, print part or all of MemF1, store part or all of MemF1, display part or all of MemF1, communicate part or all of MemF1, etc. Upon completion of block 1150, the computing device can terminate method 1100.

Example Methods of Operation

FIG. 12 shows a flowchart for method 1200, according to example embodiments. Method 1200 can be used to encode a data stream, such as, but not limited to, a data stream of data from a file. Method 1200 can be carried out by a computing device, such as computing device 200. In some examples, method 1200 can be carried out by a printing device, such as printing device 110, printing device 112, and/or printing device 114.

Method 1200 can begin at block 1210, where the computing device can receive an encoder-input data stream encoded in an encoder-input format, the encoder-input data stream can be initiated by a header identifying the encoder-input format, the encoder-input data stream can include one or more pages of content and can be terminated by a cross-reference table and a trailer object, and the cross-reference table can reference objects in the one or more pages of content, such as discussed herein at least in the context of FIGS. 7 and 8.

At block 1220, the computing device can determine a list of pages of the one or more pages within the encoder-input data stream, such as discussed herein at least in the context of FIGS. 7 and 8.

At block 1230, the computing device can reformat the encoder-input data stream into an encoder-output data stream encoded in an encoder-output format; the encoder-output data stream can include pages listed in the list of pages; the encoder-output data stream can be initiated by an identifier identifying the encoder-output format and a lookup table and terminated by the cross-reference table and the trailer object, where the lookup table references objects within the encoder-output data stream and specifies locations of the pages listed in the list of pages within the encoder-output data stream, such as discussed herein at least in the context of FIGS. 5, 7, and 8.

At block 1240, the computing device can generate an output of the computing device that is based on the encoder-output data stream, such as discussed herein at least in the context of FIGS. 7 and 8.

In some aspects, reformatting the encoder-input data stream into the encoder-output data stream encoded in the encoder-output format can include: for each current page of the list of pages: creating a new page in the encoder-output data stream for the current page; and copying content from the current page from the encoder-input data stream to the new page in the encoder-output data stream, such as discussed herein at least in the context of FIGS. 7 and 8.

In some aspects, reformatting the encoder-input data stream into the encoder-output data stream encoded in the encoder-output format can further include: determining whether the current page includes a forward object whose content is not part of the current page; after determining that the current page includes a forward object whose content is not part of the current page, retrieving content for the forward object; and adding the retrieved content for the forward object to the new page in the encoder-output data stream, such as discussed herein at least in the context of FIG. 7.

In some aspects, after determining that the current page includes a forward object whose content is not part of the current page retrieving content for the forward object can include: determining whether the lookup table has a reference for the forward object; and after determining that the lookup table has the reference for the forward object, retrieving resource data for the forward object from the reference for the forward object in the lookup table, such as discussed herein at least in the context of FIG. 7.

In some aspects, after determining that the current page includes a forward object whose content is not part of the current page retrieving content for the forward object can include: determining whether the lookup table has a reference for the forward object; after determining that the lookup table does not have a reference for the forward object, determining whether a particular page after the current page in the encoder-input data stream includes the content for the forward object; and after determining that the particular page after the current page in the encoder-input data stream includes the content for the forward object, retrieving the content for the forward object from the particular page of the encoder-input data stream, such as discussed herein at least in the context of FIG. 7.

In some aspects, adding the content for the forward object to the new page in the encoder-output data stream can include: compressing the content for the forward object; and adding the compressed content for the forward object to the new page, such as discussed herein at least in the context of FIG. 7.

In some aspects, reformatting the encoder-input data stream into the encoder-output data stream encoded in the encoder-output format can further include: determining whether the current page includes a currently-used object whose content is part of the current page; and after determining that the current page includes the currently-used object whose content is part of the current page: retrieving content for the currently-used object from the current page; compressing the retrieved content for the currently-used object; adding the compressed content for the currently-used object to the new page; and adding a reference for the currently-used object to the lookup table, the reference including resource data for the currently-used object, such as discussed herein at least in the context of FIGS. 7 and 8.

In some aspects, reformatting the encoder-input data stream into the encoder-output data stream encoded in the encoder-output format can further include: determining whether a deferred object of the current page includes content that is not used on the current page; after determining that the deferred object of the current page includes content that is not used on the current page: compressing the deferred object; and adding the compressed deferred object to a deferred object list; and refraining from adding the compressed deferred object to the new page, such as discussed herein at least in the context of FIG. 7.

In some aspects, reformatting the encoder-input data stream into the encoder-output data stream encoded in the encoder-output format can further include: determining whether the lookup table has a reference for a particular object; after determining that the lookup table does not have a reference for a particular object, determining whether the particular object is listed in the deferred object list; and after determining that the particular object is listed in the deferred object list, retrieving content for the particular object from the deferred object list, such as discussed herein at least in the context of FIG. 7.

In some aspects, copying content from the current page from the encoder-input data stream to the new page in the encoder-output data stream can include: determining whether the content from the current page includes first content that includes content other than a resource; and after determining that the content from the current page includes first content that includes content other than a resource, copying the first content to the new page in the encoder-output data stream, such as discussed herein at least in the context of FIGS. 7 and 8.

In some aspects, reformatting the encoder-input data stream into the encoder-output data stream encoded in the encoder-output format can further include: compressing one or more resources of the new page; compressing the new page; and updating the lookup table to include locations of the compressed one or more resources, such as discussed herein at least in the context of FIGS. 7 and 8.

In some aspects, receiving the encoder-input data stream can include receiving job data associated with the encoder-input data stream, and where determining the list of pages of the one or more pages within the encoder-input data stream can include determining the list of pages based on the job data, such as discussed herein at least in the context of FIGS. 7 and 8.

In some aspects, reformatting the encoder-input data stream into the encoder-output data stream encoded in the encoder-output format can include: determining whether the list of pages is a valid subset of the one or more pages; and after determining that the list of pages is a valid subset of the one or more pages, reformatting only the valid subset of the one or more pages from the encoder-input data stream into the encoder-output data stream, such as discussed herein at least in the context of FIGS. 7 and 8.

In some aspects, generating the output of the computing device can include saving a copy of the encoder-output data stream using the computing device, such as discussed herein at least in the context of FIGS. 7 and 8.

In some aspects, generating the output of the computing device can include printing at least part of one page of the encoder-output data stream on paper using the computing device and/or generating a display of at least part of one page of the encoder-output data stream using the computing device, such as discussed herein at least in the context of FIGS. 7 and 8.

In some aspects, the encoder-input format can include a portable document format (PDF), such as discussed herein at least in the context of FIGS. 7 and 8.

In some aspects, reformatting the encoder-input data stream into the encoder-output data stream encoded in an encoder-output format can include: determining a reference count for each object within the encoder-input data stream, where the reference count for a particular object within the encoder-input data stream is related to a number of times the particular object is utilized in the encoder-input data stream; and storing the reference count for each object within the encoder-input data stream in the lookup table, such as discussed herein at least in the context of FIGS. 7 and 8.

In some aspects, generating the output of the computing device that is based on the encoder-output data stream can include: generating an output of the computing device that provides access to at least one page of the list of pages, such as discussed herein at least in the context of FIGS. 7 and 8.

In some aspects, generating the output of the computing device that is based on the encoder-output data stream can include: generating an output of the computing device that includes a file storing the encoder-output data stream, such as discussed herein at least in the context of FIGS. 7 and 8.

In some aspects, the computing device can be a component of a printing device, such as discussed herein at least in the context of FIGS. 7 and 8.

FIG. 13 shows a flowchart for method 1300, according to example embodiments. Method 1300 can be used to decode a data stream, such as, but not limited to, a data stream of data from a file. Method 1300 can be carried out by a computing device, such as computing device 200. In some examples, method 1300 can be carried out by a printing device, such as printing device 110, printing device 112, and/or printing device 114.

FIG. 13 shows that method 1300 can begin at block 1310, where the computing device can receive a decoder-input data stream encoded in a decoder-input format, the decoder-input data stream including one or more pages of content, the decoder-input data stream being initiated by an identifier identifying the decoder-input format (which may be the same as the encoder-output format described above) and a lookup table, where the lookup table can reference objects within the decoder-input data stream and can specify locations of each of the one or more pages within the decoder-input data stream, such as discussed herein at least in the context of FIGS. 9, 10, and 11.

At block 1320, the computing device can generate an output of the computing device based on the decoder-input data stream, such as discussed herein at least in the context of FIGS. 9, 10, and 11.

In some aspects, generating the output of the computing device can include reformatting the decoder-input data stream into a decoder-output data stream encoded in a decoder-output format, the decoder-output data stream being initiated by a header identifying the decoder-output format (which may be the same as the encoder-input format described above), the decoder-output data stream comprising the one or more pages of content and being terminated by a cross-reference table and a trailer object, the cross-reference table referencing objects in the one or more pages of content, such as discussed herein at least in the context of FIGS. 9, 10, and 11.

In some aspects, reformatting the decoder-input data stream into the decoder-output data stream encoded in the decoder-output format can include: determining a list of pages to be encoded in the decoder-output format; creating the decoder-output data stream; and for each current page of the list of pages; determining a current location for the current page in the decoder-input data stream from the lookup table; creating a new page in the decoder-output data stream for the current page, the new page at a first location within the decoder-output data stream that is based on the current location; and copying content from the current location from the decoder-input data stream to the new page in the decoder-output data stream, such as discussed herein at least in the context of FIG. 9.

In some aspects, receiving the decoder-input data stream can include receiving a request to reformat the decoder-input data stream that includes request job data, and determining the list of pages to be encoded in the decoder-output format can include determining the list of pages based on the request job data, such as discussed herein at least in the context of FIGS. 9, 10, and 11.

In some aspects, creating the decoder-output data stream can include creating a decoder-output data stream whose storage is allocatable dynamically, such as discussed herein at least in the context of FIG. 11.

In some aspects, creating the decoder-output data stream can include: determining an amount of storage for the decoder-output data stream based on the lookup table; and creating the decoder-output data stream by at least allocating the amount of storage for the decoder-output data stream to the decoder-output data stream, such as discussed herein at least in the context of FIGS. 9 and 10.

In some aspects, copying content from the current page from the decoder-input data stream to the new page in the decoder-output data stream can include: determining whether the content from the current page is compressed; and after determining that the content from the current page is compressed, decompressing the content from the current page to obtain decompressed content, and adding the decompressed content to the new page, such as discussed herein at least in the context of FIGS. 9, 10, and 11.

In some aspects, copying content from the current page from the decoder-input data stream to the new page in the decoder-output data stream can include: determining whether the content from the current page includes a first resource; after determining whether the content from the current page includes a first resource, obtain a first location for the first resource in the current page; positioning the decoder-output data stream to a second location corresponding to the first location; and copying content from the first resource to the second location in the decoder-output data stream, such as discussed herein at least in the context of FIG. 9.

In some aspects, copying content from the first resource to the second location in the decoder-output data stream can include: obtaining data for the first resource from the first location in the decoder-input data stream; decompressing the data for the first resource to obtain a decompressed resource; and copying the decompressed resource to the second location in the decoder-output data stream, such as discussed herein at least in the context of FIG. 9.

In some aspects, creating the decoder-output data stream can include determining a cross-reference table for the decoder-output data stream, and copying content from the first resource to the second location can include adding a first entry to the cross-reference table for the first resource, the first entry including the second location, such as discussed herein at least in the context of FIG. 9.

In some aspects, method 1300 can further include: after copying content from the pages in the list of pages to the decoder-output data stream, adding the cross-reference table to the end of the decoder-output data stream, such as discussed herein at least in the context of FIGS. 9, 10, and 11.

In some aspects, reformatting the decoder-input data stream into the decoder-output data stream encoded in the decoder-output format can include: allocating first memory to store a first object of the decoder-input data stream; determining a reference count for the first object, the reference count related to a number of times the first object is utilized in the decoder-output data stream; and after copying content from the first object from the decoder-input data stream to the decoder-output data stream: decrementing the reference count for the first object; determining whether the reference count for the first object is zero; and after determining that the reference count for the first object is zero, deallocating the first memory, such as discussed herein at least in the context of FIGS. 9, 10, and 11.

In some aspects, generating the output of the computing device can include saving a copy of the decoder-output data stream using the computing device, such as discussed herein at least in the context of FIGS. 9, 10, and 11.

In some aspects, generating the output of the computing device can include printing at least part of one page of the decoder-output data stream on paper using the computing device and/or generating a display of at least part of one page of the decoder-output data stream using the computing device, such as discussed herein at least in the context of FIGS. 9, 10, and 11.

In some aspects, each page of the second data stream can be processed in parallel by one or more processors in a printer device for printing or by one or more processors of the computing device for displaying, such as discussed herein at least in the context of FIGS. 9, 10, and 11.

In some aspects, the decoder-output format can include a portable document format (PDF), such as discussed herein at least in the context of FIGS. 9, 10, and 11.

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A method, comprising:
receiving, at a computing device, an encoder-input data stream encoded in an encoder-input format, the encoder-input data stream being initiated by a header identifying the encoder-input format, the encoder-input data stream comprising one or more pages of content and being terminated by a cross-reference table and a trailer object, the cross-reference table referencing objects in the one or more pages of content;
determining a list of pages of the one or more pages within the encoder-input data stream using the computing device;

reformatting the encoder-input data stream into an encoder-output data stream encoded in an encoder-output format using the computing device, the encoder-output data stream including pages listed in the list of pages, the encoder-output data stream being initiated by an identifier identifying the encoder-output format and a lookup table and terminated by the cross-reference table and the trailer object, wherein the lookup table references objects within the encoder-output data stream and specifies locations of the pages listed in the list of pages within the encoder-output data stream; and generating an output of the computing device that is based on the encoder-output data stream.

2. The method of claim 1, wherein reformatting the encoder-input data stream into the encoder-output data stream encoded in the encoder-output format comprises:

for each current page of the list of pages:
creating a new page in the encoder-output data stream for the current page; and
copying content from the current page from the encoder-input data stream to the new page in the encoder-output data stream.

3. The method of claim 2, wherein reformatting the encoder-input data stream into the encoder-output data stream encoded in the encoder-output format further comprises:

determining whether the current page includes a forward object whose content is not part of the current page;
after determining that the current page includes a forward object whose content is not part of the current page, retrieving content for the forward object; and
adding the retrieved content for the forward object to the new page in the encoder-output data stream.

4. The method of claim 3, wherein after determining that the current page includes a forward object whose content is not part of the current page retrieving content for the forward object comprises:

determining whether the lookup table has a reference for the forward object; and
after determining that the lookup table has the reference for the forward object, retrieving resource data for the forward object from the reference for the forward object in the lookup table.

5. The method of claim 3, wherein after determining that the current page includes a forward object whose content is not part of the current page retrieving content for the forward object comprises:

determining whether the lookup table has a reference for the forward object;
after determining that the lookup table does not have a reference for the forward object, determining whether a particular page after the current page in the encoder-input data stream includes the content for the forward object; and
after determining that the particular page after the current page in the encoder-input data stream includes the content for the forward object, retrieving the content for the forward object from the particular page of the encoder-input data stream.

6. The method of claim 3, wherein adding the content for the forward object to the new page in the encoder-output data stream comprises:

compressing the content for the forward object; and
adding the compressed content for the forward object to the new page.

7. The method of claim 2, wherein reformatting the encoder-input data stream into the encoder-output data stream encoded in the encoder-output format further comprises:

determining whether the current page includes a currently-used object whose content is part of the current page; and
after determining that the current page includes the currently-used object whose content is part of the current page:
retrieving content for the currently-used object from the current page;
compressing the retrieved content for the currently-used object;
adding the compressed content for the currently-used object to the new page; and
adding a reference for the currently-used object to the lookup table, the reference including resource data for the currently-used object.

8. The method of claim 2, wherein reformatting the encoder-input data stream into the encoder-output data stream encoded in the encoder-output format further comprises:

determining whether a deferred object of the current page includes content that is not used on the current page;
after determining that the deferred object of the current page includes content that is not used on the current page:
compressing the deferred object; and
adding the compressed deferred object to a deferred object list; and
refraining from adding the compressed deferred object to the new page.

9. The method of claim 8, wherein reformatting the encoder-input data stream into the encoder-output data stream encoded in the encoder-output format further comprises:

determining whether the lookup table has a reference for a particular object;
after determining that the lookup table does not have a reference for a particular object, determining whether the particular object is listed in the deferred object list; and
after determining that the particular object is listed in the deferred object list, retrieving content for the particular object from the deferred object list.

10. The method of claim 2, wherein copying content from the current page from the encoder-input data stream to the new page in the encoder-output data stream comprises:

determining whether the content from the current page includes first content that comprises content other than a resource; and
after determining that the content from the current page includes first content that comprises content other than a resource, copying the first content to the new page in the encoder-output data stream.

11. The method of claim 2, wherein reformatting the encoder-input data stream into the encoder-output data stream encoded in the encoder-output format further comprises:

compressing one or more resources of the new page;
compressing the new page; and
updating the lookup table to include locations of the compressed one or more resources.

12. The method of claim 1, wherein receiving the encoder-input data stream comprises receiving job data associated with the encoder-input data stream, and wherein determining the list of pages of the one or more pages within the encoder-input data stream comprises determining the list of pages based on the job data.

13. The method of claim 1, wherein reformatting the encoder-input data stream into the encoder-output data stream encoded in the encoder-output format comprises:
    determining whether the list of pages is a valid subset of the one or more pages; and
    after determining that the list of pages is a valid subset of the one or more pages, reformatting only the valid subset of the one or more pages from the encoder-input data stream into the encoder-output data stream.

14. The method of claim 1, wherein generating the output of the computing device comprises saving a copy of the encoder-output data stream using the computing device.

15. The method of claim 1, wherein generating the output of the computing device comprises printing at least part of one page of the encoder-output data stream on paper using the computing device and/or generating a display of at least part of one page of the encoder-output data stream using the computing device.

16. The method of claim 1, wherein the encoder-input format comprises a portable document format (PDF).

17. The method of claim 1, wherein reformatting the encoder-input data stream into the encoder-output data stream encoded in an encoder-output format comprises:
    determining a reference count for each object within the encoder-input data stream, wherein the reference count for a particular object within the encoder-input data stream is related to a number of times the particular object is utilized in the encoder-input data stream; and
    storing the reference count for each object within the encoder-input data stream in the lookup table.

18. The method of claim 1, wherein generating the output of the computing device that is based on the encoder-output data stream comprises:
    generating an output of the computing device that provides access to at least one page of the list of pages.

19. The method of claim 1, wherein generating the output of the computing device that is based on the encoder-output data stream comprises:
    generating an output of the computing device that comprises a file storing the encoder-output data stream.

20. A printing device, comprising:
    one or more processors; and
    data storage configured to store at least computer-readable instructions that, when executed by the one or more processors, cause the printing device to perform tasks comprising:
        receiving an encoder-input data stream encoded in an encoder-input format, the encoder-input data stream being initiated by a header identifying the encoder-input format, the encoder-input data stream comprising one or more pages of content and being terminated by a cross-reference table and a trailer object, the cross-reference table referencing objects in the one or more pages of content;
        determining a list of pages of the one or more pages within the encoder-input data stream;
        reformatting the encoder-input data stream into an encoder-output data stream encoded in an encoder-output format, the encoder-output data stream including pages listed in the list of pages, the encoder-output data stream being initiated by an identifier identifying the encoder-output format and a lookup table and terminated by the cross-reference table and the trailer object, wherein the lookup table references objects within the encoder-output data stream and specifies locations of the pages listed in the list of pages within the encoder-output data stream; and
        generating an output that is based on the encoder-output data stream.

\* \* \* \* \*